United States Patent
Braun et al.

(10) Patent No.: US 12,224,837 B2
(45) Date of Patent: Feb. 11, 2025

(54) SYSTEMS AND METHODS FOR RECONFIGURABLE REPEATERS FOR WIRELESS TELECOMMUNICATIONS

(71) Applicant: CommScope Technologies LLC, Hickory, NC (US)

(72) Inventors: Gerhard Braun, Ederheim (DE); Gerald Steidle, Buchdorf (DE); Josef Mayer, Rennertshofen (DE); Patrick Braun, Munningen (DE); Daniel Schwab, Gersthofen (DE); Peter Gunzner, Monheim (DE); Thomas Rauwolf, Minderoffingen (DE); Rainer Friedrich, Maihingen (DE)

(73) Assignee: Outdoor Wireless Networks LLC, Claremont, NC (US)

( * ) Notice: Subject to any disclaimer, the term of this patent is extended or adjusted under 35 U.S.C. 154(b) by 417 days.

(21) Appl. No.: 17/724,328

(22) Filed: Apr. 19, 2022

(65) Prior Publication Data
US 2022/0345193 A1    Oct. 27, 2022

Related U.S. Application Data

(60) Provisional application No. 63/176,535, filed on Apr. 19, 2021.

(51) Int. Cl.
*H04B 7/06* (2006.01)
*H04B 7/0413* (2017.01)
(Continued)

(52) U.S. Cl.
CPC ......... *H04B 7/0691* (2013.01); *H04B 7/0413* (2013.01); *H04L 1/0025* (2013.01); *H04L 5/14* (2013.01)

(58) Field of Classification Search
CPC .. H04B 7/0691; H04B 7/0413; H04B 7/0689; H04B 7/15557; H04L 1/0025; H04L 5/14
See application file for complete search history.

(56) References Cited

U.S. PATENT DOCUMENTS

| | | | |
|---|---|---|---|
| 9,748,906 B2 | 8/2017 | Stewart et al. | |
| 9,768,855 B2 | 9/2017 | Lange | |

(Continued)

FOREIGN PATENT DOCUMENTS

| | | | | |
|---|---|---|---|---|
| EP | 751631 A1 | * | 1/1997 | ............... H04B 1/44 |
| EP | 2802089 A1 | * | 11/2014 | ........... H04B 7/1555 |

(Continued)

OTHER PUBLICATIONS

Nelson et al., "Digital Predistortion Techniques for Mobile PA Test", High Frequency Electronics, https://www.highfrequencyelectronics.com/indez/pphp?option=com_conte...iques-for-mible-pa-test&catid=94:2014-06-june-articles&Itemid-189, as downloaded Dec. 7, 2020, pp. 1 through 10, Published: US.

(Continued)

*Primary Examiner* — Chi H Pham
*Assistant Examiner* — Samuel Dilan Rutnam
(74) *Attorney, Agent, or Firm* — Fogg & Powers LLC

(57) ABSTRACT

In one embodiment, a RF signal repeater switchable between SISO and MIMO comprises: a controller; a first transmitter path switchably coupled to first donor and coverage antennas; a second transmitter path switchably coupled to second donor and coverage antennas; a first receiver path switchably coupled to the first donor and coverage antennas; a second receiver path switchably coupled to the second donor and coverage antennas. The controller configures the repeater for a MIMO TDD operating mode by: configuring the first transmitter path and the second receiver path to repeat at least a first MIMO channel (Continued)

of UE uplink RF signals and at least a first MIMO channel of base station downlink RF signals; and configuring the second transmitter path and the first receiver path to repeat at least a second MIMO channel of UE uplink RF signals and at least a second MIMO channel of base station downlink RF signals.

28 Claims, 11 Drawing Sheets

(51) Int. Cl.
*H04L 1/00* (2006.01)
*H04L 5/14* (2006.01)

(56) References Cited

U.S. PATENT DOCUMENTS

| | | | |
|---|---|---|---|
| 11,979,218 B1* | 5/2024 | Zhan | ............... H04B 7/15535 |
| 2006/0193271 A1 | 8/2006 | Proctor, Jr. et al. | |
| 2007/0268846 A1 | 11/2007 | Proctor et al. | |
| 2010/0177668 A1 | 7/2010 | Ahn | |
| 2011/0292863 A1* | 12/2011 | Braz | ................... H04B 7/155 |
| | | | 370/315 |
| 2013/0183895 A1 | 7/2013 | Gore et al. | |
| 2014/0011442 A1 | 1/2014 | Dussmann | |
| 2019/0260426 A1 | 8/2019 | Cook et al. | |
| 2019/0372655 A1* | 12/2019 | Pinder | ............... H04B 7/15557 |

FOREIGN PATENT DOCUMENTS

| | | | | |
|---|---|---|---|---|
| WO | WO-2005002109 A2 * | 1/2005 | ........... | H03G 3/3042 |
| WO | 2013169225 A1 | 11/2013 | | |
| WO | 2019231625 A1 | 12/2019 | | |

OTHER PUBLICATIONS

International Searching Authority, "International Search Report and Written Opinion", from PCT Application No. PCT/US2022/025408, from Foreign Counterpart to U.S. Appl. No. 17/724,328, Jan. 13, 2023, pp. 1 through 8, Published in: KR.

* cited by examiner

SYSTEMS AND METHODS FOR RECONFIGURABLE REPEATERS FOR WIRELESS TELECOMMUNICATIONS

CROSS-REFERENCE TO RELATED APPLICATIONS

This application claims the benefits of U.S. Provisional Application Ser. No. 63/176,535, filed Apr. 19, 2021, and titled "SYSTEMS AND METHODS FOR RECONFIGURABLE REPEATERS FOR WIRELESS TELECOMMUNICATIONS," which is hereby incorporated herein by reference.

BACKGROUND

Repeater systems are often used to improve the coverage of wireless base stations by extending the coverage area provided by the base station and avoiding structures that contribute to penetration losses. The wireless service provided by the base stations can include commercial cellular service and/or private or public safety wireless communications.

Many repeaters use TDD (Time Division Duplex) links to utilize a frequency band for both uplink and downlink transmissions. A TDD link operates on a single frequency band but transmits uplink communications and downlink communications at distinct times. TDD communications schemes have the advantage of more fully using the available radio spectrum. Using TDD, however, is expensive because dedicated hardware resources are not fully utilized. For example, standard TDD repeater systems that split the time allocated between uplink and downlink communications may use the available resources of the repeater's uplink signal path (such as uplink analog-to-digital converters and power amplifiers) a portion of the time and the available resources of the repeater's downlink communication path (such as uplink analog-to-digital converters and power amplifiers) a portion of the time.

The operators of wireless communications networks also choose between repeaters that operate using single-input-single-output (SISO) channels and repeaters that operate using multiple-input-multiple-output (MIMO) channels. Although SISO wireless communications are generally less complex, and less expensive to implement, a network operator may desire to use MIMO wireless communications when they are constrained to using a frequency band of a given bandwidth but want to increase the capacity of the communication links. Alternatively, a network operator with an underutilized frequency band may prefer to operate using less complex SISO channels having a bandwidth that more fully utilizes the frequency band or operates with more than one SISO channel within the frequency band. However, these potential MIMO and SISO configurations have different hardware requirements, so the network operator must purchase different products depending on the desired configuration of a planned repeater deployment site and must also purchase (and stock) different repeater parts for maintenance and repair.

SUMMARY

In one embodiment, a reconfigurable radio frequency (RF) signal repeater switchable between single-input-single-output (SISO) and multiple-input-multiple-output (MIMO) operating modes includes a repeater controller; a first bidirectional transmitter path coupled to the repeater controller, and switchably coupled to a first donor antenna and a first coverage antenna; a second bidirectional transmitter path coupled to the repeater controller, and switchably coupled to a second donor antenna and a second coverage antenna; a first bidirectional receiver path coupled to the repeater controller, and switchably coupled to the first donor antenna and the first coverage antenna; a second bidirectional receiver path coupled to the repeater controller, and switchably coupled to the second donor antenna and the second coverage antenna; wherein the repeater controller is adapted to configure the repeater for a MIMO time-division-duplex (TDD) operating mode by: configuring the first bidirectional transmitter path and the second bidirectional receiver path to repeat at least a first MIMO channel of user equipment (UE) uplink RF signals and at least a first MIMO channel of base station downlink RF signals; and configuring the second bidirectional transmitter path and the first bidirectional receiver path to repeat at least a second MIMO channel of user equipment (UE) uplink RF signals and at least a second MIMO channel of base station downlink RF signals.

DRAWINGS

Per common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof and, in which, is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. Therefore, the following detailed description is not to be taken in a limiting sense.

Figure 1:
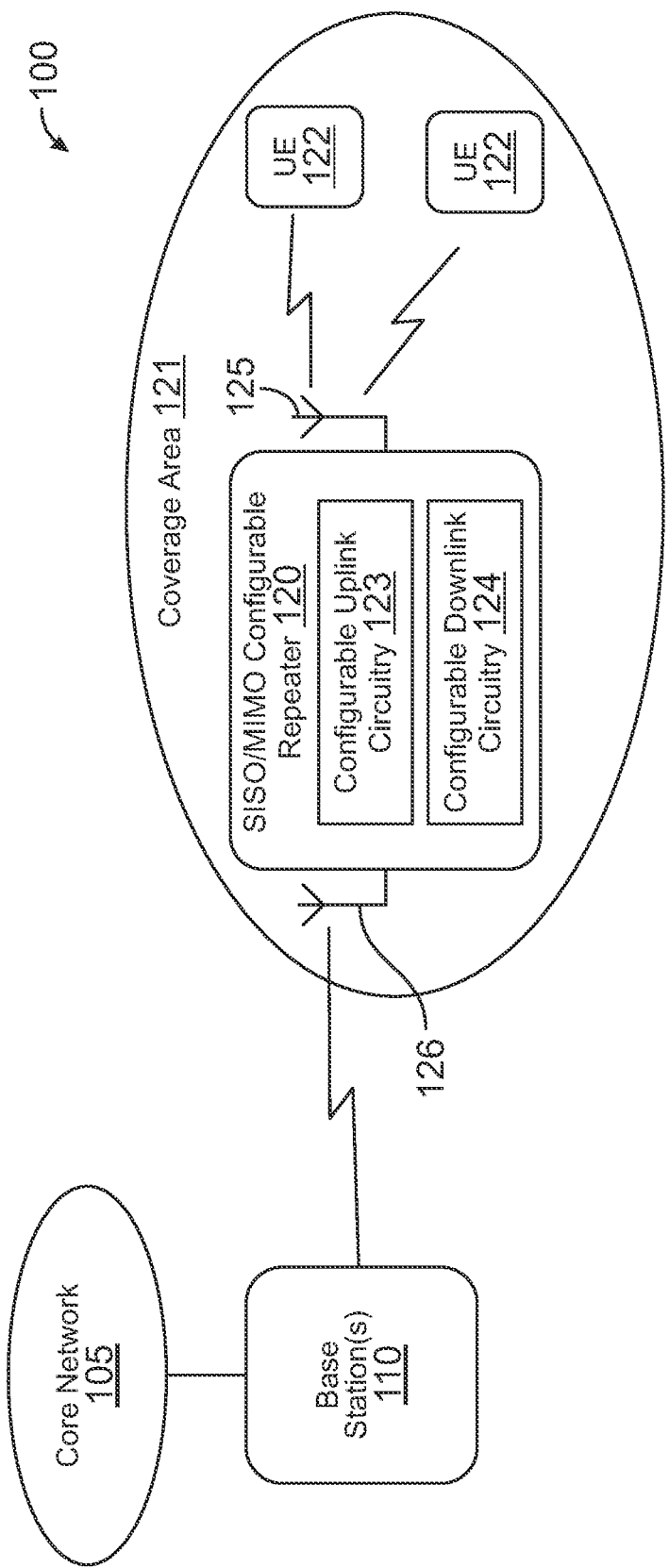
FIG. 1 is a block diagram illustrating one exemplary embodiment of a communications network.

FIG. 1 is a block diagram illustrating one exemplary embodiment of a wireless communications network 100. The wireless communications network 100 includes one or more wireless communications network base stations 110 (which may include, for example, a cellular base station) coupled to a core network 105 of one or more wireless communications service providers, and at least one over-the-air repeater that comprises a SISO/MIMO configurable repeater 120. The SISO/MIMO configurable repeater 120 is located in an area where it operates to provide a coverage area 121 (such as in a remote location or inside a building) that expands the coverage area of the one or more base stations 110. In some embodiments, the base station 110 shown in FIG. 1 may be implemented as a radio access network (RAN) system and may comprise a centralized or cloud RAN (C-RAN) architecture or other base station architecture. In some embodiments, the base station 110 comprises a 3GPP 5G RAN architecture radio base station (known as a gNB) connected to a 5G core network 105 or may comprise another form of distributed radio base station. It should be understood that in some embodiments, one or more of the base stations 110 that utilize the repeater 120 may be coordinated or synchronized base stations associated with multiple operators. In this disclosure, such synchronized base stations may still be referred to collectively and generally herein as a "base station 110."

As indicated in FIG. 1, one or more over-the-air repeaters 120 may be provided to be used in conjunction with the base station 110 to provide a coverage area 121 through which user equipment (UE) 122 devices can access wireless connectivity services. The UE 122 includes devices such as, but not limited to, mobile or cellular telephones, computing tablets, laptops, wearable devices, or non-mobile devices that utilize wireless connectivity from wireless service providers. In one embodiment, some or all communications between the base station 110 and UE 122 use a time division duplex (TDD) communication scheme. TDD schemes enable bidirectional communication between two devices by having uplink transmissions (from the UE 122 toward the base station 110) and downlink transmissions (from the base station 110 toward the UE 122) occur at different times. Both uplink and downlink communications share the same frequencies in such a TDD communication scheme.

In the downlink direction, the repeater 120 is configured to receive one or more downlink radio frequency signals from the base stations 110. These signals are also referred to herein as "base station downlink RF signals." Each base station downlink signal includes one or more radio frequency channels used for communicating in the downlink direction with the UE 122 over a relevant wireless air interface. Typically, each base station downlink signal is received as an analog radio frequency signal, though in some embodiments, one or more of the base station signals are received in a digital form. For example, in some repeater systems, one or more of the base station downlink RF signals are received in a digital baseband form complying with the Common Public Radio Interface ("CPRI") protocol, Open Radio Equipment Interface ("ORI") protocol, the Open Base Station Standard Initiative ("OBSAI") protocol, Open Radio Access Network ("O-RAN"), or other protocol.

In the embodiment of FIG. 1, the SISO/MIMO configurable repeater 120 includes configurable downlink repeater circuitry 124 to process and transport the "base station downlink RF signals." The configurable downlink repeater circuitry 124 in the repeater 120 is configured to generate one or more downlink radio frequency signals radiated from one or more antennas 125 associated with the repeater 120 for reception by the UE 122. These downlink radio frequency signals are analog radio frequency signals referred to herein as "repeated downlink RF signals." Each repeated downlink radio frequency signal includes one or more of the downlink radio frequency channels used for communicating with the UE 122 over the wireless air interface. In this exemplary embodiment, the repeater 120 is an active repeater system in which the configurable downlink repeater circuitry 124 comprises one or more amplifiers (or other gain elements) that are used to control and adjust the gain of the repeated downlink RF signals radiated from the one or more antennas 125.

In the uplink direction, the repeater 120 is configured to receive respective uplink radio frequency signals from the UE 122 within the coverage area 121 of the repeater 120. The uplink radio frequency signals are analog radio frequency signals referred to herein as "UE uplink radio frequency signals." Each UE uplink radio frequency signal includes one or more radio frequency channels used for communicating in the uplink direction with UE 122 over the relevant wireless air interface.

In the embodiment of FIG. 1, the SISO/MIMO configurable repeater 120 includes configurable uplink circuitry 123 to process and transport the "UE uplink radio frequency signals." The configurable uplink circuitry 123 in the repeater 120 is also configured to generate one or more uplink radio frequency signals radiated from one or more antennas 125 associated with the repeater 120 for reception by the base stations 110. The one or more uplink radio frequency signals are also referred to herein as "repeated uplink RF signals." Each repeated uplink RF signal includes one or more of the uplink radio frequency channels used for communicating with the UE 122 over the wireless air interface.

In exemplary embodiments, the repeater 120 is an active repeater system in which the configurable uplink circuitry 123 comprises one or more amplifiers (or other gain elements) that are used to control and adjust the gain of the repeated uplink radio frequency signals provided to the one or more base stations 110. Typically, each repeated uplink RF signal is provided to the one or more base stations 110 as an analog radio frequency signal, though, in some embodiments, one or more of the repeated uplink RF signals are provided to the one or more base stations 110 in a digital form. For example, in some repeater systems, one or more of the repeated uplink RF signals are transmitted in a digital baseband form complying with the Common Public Radio Interface ("CPRI") protocol, Open Radio Equipment Interface ("ORI") protocol, the Open Base Station Standard Initiative ("OBSAI") protocol, Open Radio Access Network (O-RAN), or other protocol.

The configurable uplink circuitry 123 and configurable downlink circuitry 124 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the configurable uplink circuitry 123 and configurable downlink circuitry 124 may share common circuitry and/or components.

As is more fully detailed in the Figures discussed below, the configurable uplink circuitry 123 and configurable downlink circuitry 124 include re-configurable circuitry that can be switched between SISO and MIMO operating modes. As such, hardware components for the SISO/MIMO configurable repeater 120 can be installed in the field and then configured to operate in either a SISO operating mode or a MIMO operating mode depending on the specific needs or desired configuration for the UEs 122 in the coverage area 121. In some embodiments, in the MIMO operating mode, the repeater 120 is configured for 2×2 MIMO operation such that the communications link between the repeater and each UE 122 comprises two upstream MIMO channels and two downstream MIMO channels, thus providing a combined bandwidth for upstream and downstream communication that is twice that of a single channel.

In some embodiments, in the SISO operating mode, the repeater 120 may be configured for extended bandwidth SISO where the total bandwidth provided by the single SISO upstream and downstream channels with the UE 122 is equivalent to that provided by the two upstream MIMO channels and two downstream MIMO channels. For example, in some embodiments, in the MIMO operating mode, configurable uplink circuitry 123 and configurable downlink circuitry 124 establish two 100 MHz upstream MIMO channels and two 100 MHz downstream MIMO channels with each UE 122, thus providing a data throughput equivalent to 200 MHz bandwidth in each of the uplink and downlink directions. Such a configuration may be appropriate, for example, where a wireless service provider holds a license to operate over a specified 100 MHz of spectrum but desires to provide greater bandwidth. The 2×2 MIMO operation would permit the operator to provide two 100 MHz MIMO channels using the 100 MHz of licensed spectrum. In other circumstances, the network operator may be licensed to operate over a specified 200 MHz of spectrum. In that case, the configurable uplink circuitry 123 and configurable downlink circuitry 124 can instead be configured to establish a 200 MHz upstream SISO channel and a 200 MHz downstream SISO channel with each UE 122, to take advantage of the full spectrum available to them and avoid complexities associated with MIMO.

Moreover, the configurable uplink circuitry 123 and configurable downlink circuitry 124 are implemented utilizing shared bidirectional signal transport paths to further reduce the hardware costs and complexity of the repeater 120. As opposed to needing a set of four digital-to-analog converters, four power amplifiers, four analog-to-digital converters, and four low noise amplifiers, the repeater 120 utilizes the shared bidirectional signal transport paths that include two of each component with the signal paths switched between carrying uplink and downlink RF signals to repeat RF signals comprising 2×2 MIMO channels.

Figure 2:
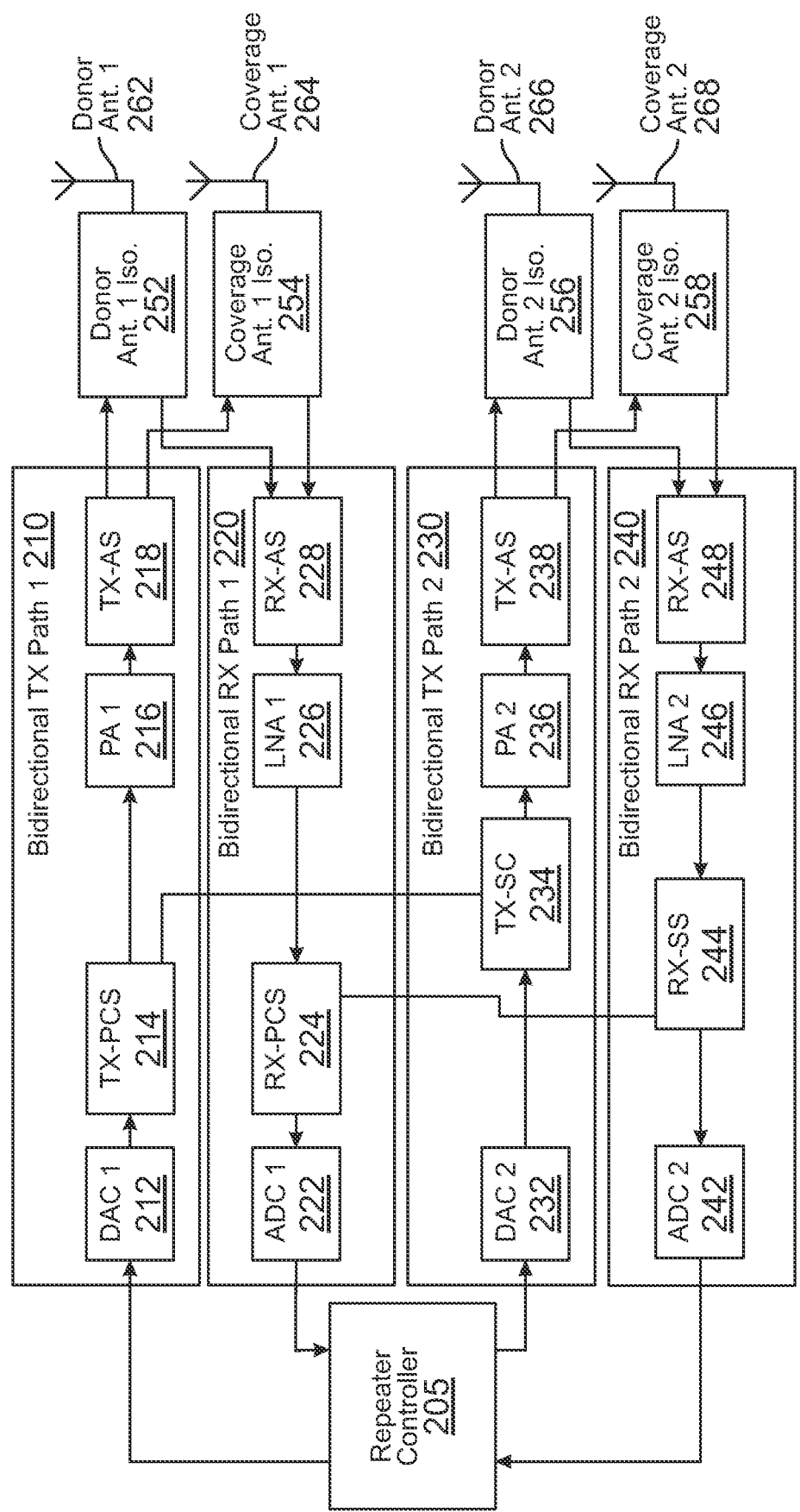
FIGS. 2 and 2A-2E are block diagrams illustrating an example TDD SISO/MIMO configurable repeater embodiment.

FIG. 2 is a block diagram illustrating a TDD SISO/MIMO configurable repeater 120 such as described for use in the wireless communication system 100 of FIG. 1. In FIG. 2, a repeater controller 205 is coupled to a first bidirectional transmitter (TX) path 210 and a second bidirectional transmitter (TX) path 230 for transmitting repeated downlink RF signals when the repeater 120 is operating in the TDD downlink (DL) mode and for transmitting repeated uplink RF signals when the repeater 120 is operating in TDD uplink (UL) mode. The repeater controller 205 is further coupled to a first bidirectional receiver (RX) path 220 and a second bidirectional receiver (RX) path 240 for receiving base station downlink RF signals when the repeater 120 is operating in TDD downlink (DL) mode and for receiving UE uplink radio frequency signals when the repeater 120 is operating in TDD uplink (UL) mode.

Figure 2A:
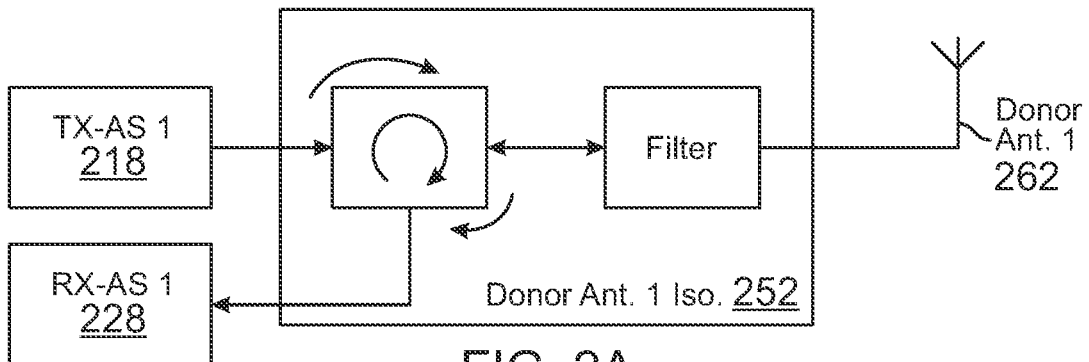
Figure 2B:
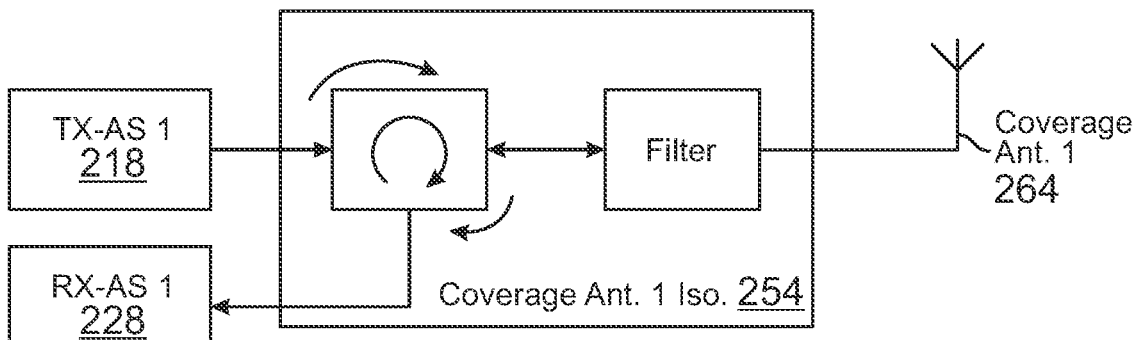
Figure 2C:
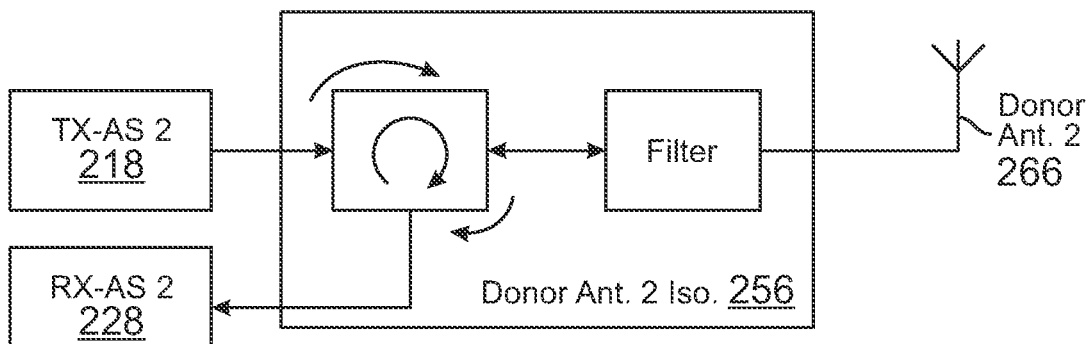
Figure 2D:
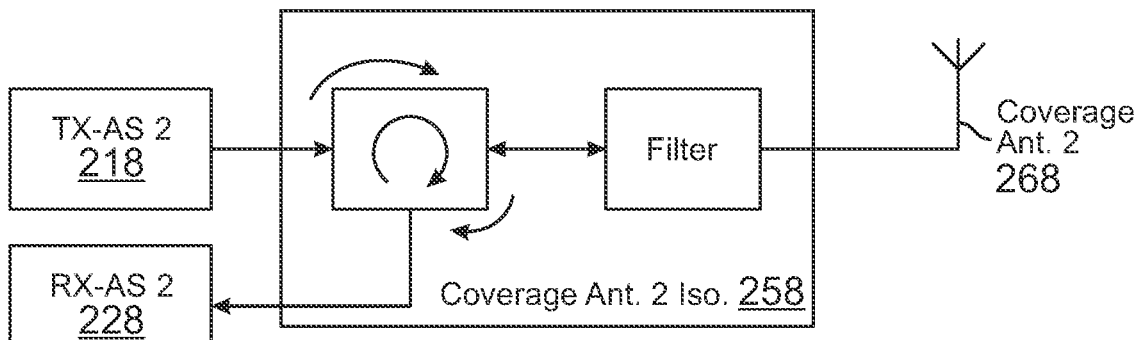

Each of the bidirectional signal transport paths 210, 220, 230, and 240 are reconfigurably coupled to one of the antennas 262, 264, 266, and 268 via a respective antenna isolation circuit 252 (shown in FIG. 2A), 254 (shown in FIG. 2B), 256 (shown in FIG. 2C), and 258 (shown in FIG. 2D). Each of the antenna isolation circuits 252, 254, 256, and 258 function to direct incoming RF signals (i.e., the UE uplink radio frequency signals or base station downlink RF signals) received by the antennas 262, 264, 266, and 268 to either the first or second RX paths 220 and 240, while also isolating (and thus protecting) the first and second RX paths 220 and 240 (and their electronics) from high power RF signals transmitted by the first and second TX paths 210 and 230 via the antennas 262, 264, 266, and 268. The particular isolation circuitry used to implement the antenna isolation circuits is not limited to any particular isolation circuitry and may be readily determined by one skilled in the art who has studied this disclosure. For example, the particular isolation circuitry shown in FIGS. 2A, 2B, 2C, and 2D comprises a circulator coupled to a filter. The filter may be configurable to pass the frequency band of the RF signal being repeated. For each, an RF signal received at the connected antenna is filtered, received by the circulator, and routed to the appropriate receiver (RX) path. An RF signal received by the circulator from a TX path is routed through a filter and radiated from the connected antenna. The 3-port circulator provides a low insertion loss between the TX path and the antenna and between the antenna and the RX path, but the circulator provides a very high attenuation path between the TX path and the RX path to effectively isolate the RX path from signals generated by the TX path. However, a switch (instead of the circulator) may also provide effective isolation, where the switch couples the TX path to the antenna and de-couples the RX path from the antenna when the TX path is scheduled to transmit a signal and where the switch couples the RX path to the antenna and de-couples the TX path from the antenna when the RX path is scheduled to receive a signal.

Referring again to FIG. 2, the first bidirectional TX path 210 comprises a digital-to-analog converter (DAC) 212, a transmit path combiner switch (TX-PCS) 214, a power amplifier (PA 216), and a transmit antenna selector switch (TX-AS) 218. The second bidirectional TX path 230 comprises a digital-to-analog converter (DAC) 232, a transmit path signal combiner (TX-SC) 234, a power amplifier (PA 236), and a transmit antenna selector switch (TX-AS) 238. The first bidirectional RX path 220 comprises an analog-to-digital converter (ADC) 222, a receive path combiner switch (RX-PCS) 224, a low noise amplifier (LNA 226), and a receive antenna selector switch (RX-AS) 228. The second bidirectional RX path 240 comprises an analog-to-digital converter (ADC) 242, a receive path signal splitter (RX-SS) 244, a low noise amplifier (LNA 246), and a receive antenna selector switch (RX-AS) 248.

It should be understood that in some embodiments, the first bidirectional TX path 210 and the second bidirectional TX path 230 may each comprise a baseband upconverter between their respective DAC and PA components (for example, just before the respective PA) to place the signal to be transmitted into an assigned RF frequency band for transmission as described herein. Similarly, in some embodiments, the first bidirectional RX path 220 and the second bidirectional RX path 240 may each comprise a baseband downconverter between their respective LNA and ADC components (for example, just after the respective LNA) to place the received signal from its assigned RF frequency band to baseband for further processing as described herein. Alternatively, for some embodiments, baseband upconverters and/or baseband downconverters may be omitted with RF signals directly applied to the ADC components and RF signals directly output from the DAC components.

In some embodiments, the components that define each of the bidirectional TX paths 210 and 230, and bidirectional RX paths 220 and 240, can transport RF signals of the pre-determined bandwidth for extended bandwidth SISO operation. The DACs 212 and 232 and ADCs 222 and 242 would then each comprise sufficient resolution and dynamic range so that when operated in parallel (as described below), they together are capable of converting the full bandwidth of the received extended bandwidth SISO RF signals. For example, in some embodiments, the bidirectional TX paths 210 and 230, and bidirectional RX paths 220 and 240, are capable of transporting RF signals of up to 200 MHz of bandwidth, with the DACs 212 and 232 and ADCs 222 and 242 each capable of processing 100 MHz of bandwidth. It should be understood that these bandwidths are provided strictly as examples that can be scaled to support RF signals of other bandwidths.

Figure 2E:
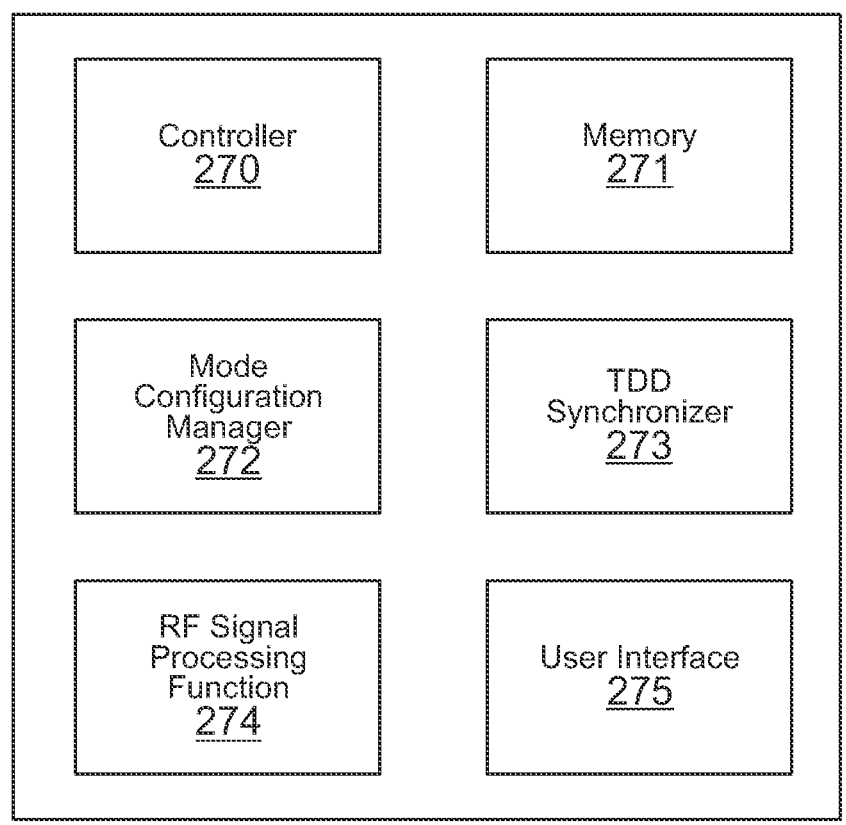

FIG. 2E is a block diagram illustrating an example repeater controller 205 embodiment. The repeater controller 205 comprises a controller 270 coupled to a memory 271. The controller 270 may be implemented by a processor, field-programmable gate array (FPGA), application-specific integrated circuit (ASIC), or other programmable processing circuit. The controller 270 and memory 271 are programmed with code that, when executed, implement the features and functions attributed to the repeater controller 205 as described herein. In some embodiments, the memory 271 may include computer-readable operating instructions as discussed above that, when executed by the controller 270, provide functions of the repeater controller 205. The computer-readable instructions may be encoded within the memory 271. The memory 271 may therefore comprise computer non-transient readable storage media including any volatile, nonvolatile, magnetic, optical, or electrical media, such as but not limited to, a random access memory (RAM), read-only memory (ROM), non-volatile RAM (NVRAM), electrically erasable programmable ROM (EE-PROM), flash memory, or any other storage medium.

As shown in FIG. 2E, the repeater controller 205 includes a mode configuration manager 272 executed by the controller 270. The mode configuration manager 272 manages reconfiguration of the various components of the repeater controller 205 for switching between 2×2 MIMO, extended bandwidth SISO, and two-channel SISO modes, which are each described in more detail below. For example, the mode configuration manager 272 operates the switches 214 and 224 to adjust the signal paths. Moreover, for embodiments that include an FDD/TDD switching circuit, the configuration manager 272 controls reconfiguration of the FDD/TDD switching circuit between FDD and TDD modes, described in more detail below. The TDD synchronizer 273 comprises one or more algorithms for synchronizing the switching of the repeater 120 between uplink (UL) and downlink (DL) operations with the TDD schedule of the base station 110. In some embodiments, the antenna selector switches 218, 228, 238, and 248 switch alignment of the bidirectional TX and RX paths based on signals from the TDD synchronizer 273. In some embodiments, the repeater controller 205 executes a signal processing function 274 that performs the system gain control, system power control, crest factor reduction (CFR), filter configurations, and/or digital pre-distortion (DPD) adjustments and reconfigurations described throughout this disclosure, and manages the routing of received signals from the bidirectional RX paths 220 and 240 to bidirectional TX paths 210 and 230. Settings associated with functions performed by the repeater controller 205 may be stored in the memory 271 and retrieved by the controller 270 as needed.

In some embodiments, the RF Signal Processing Function 274 implements digital pre-distortion (DPD), which adds a non-linear distortion to the repeated digital signals that are output from the repeater controller 205 to the bidirectional TX paths 210 and 230. The applied non-linear distortions are inversely matched to the linearity characteristic of the PA 216 and 236 so that the resulting analog RF signal outputs of the PA 216 and 236 are linear across the frequency band. In some embodiments, filter coefficients that characterize the applied non-linear distortion can be adapted to the operating mode of the repeater 120. For example, intelligent delta DPD coefficient adaption could be applied by the RF Signal Processing Function 274 for downlink signals over a bidirectional TX path, and/or for uplink signals over a bidirectional RX path. Dynamically adapting coefficients may be accomplished by switching lookup tables (stored in memory 271) to account for different PA behaviors at variable power levels, by using different thresholds to adapt TX/RX in a DPD Model executed by the controller 270, by using separate different DPD engines, by configuring the DPD for a worst-case path downlink transmission that still achieves good performance for the uplink transmission, or, vice versa, by configuring DPD for a worst-case path uplink transmission that still achieves good performance for the downlink transmission.

In some embodiments, the repeater controller 205 may include a user interface 275 through which a repeater operator may enter configuration adjustments and/or settings. The user interface 275 may comprise a local human-machine interface (HMI) and/or a network through which the operator can connect from a remote location.

Operation in 2×2 MIMO is now described in more detail with reference to FIGS. 3 and 4. When the repeater 120 is configured for 2×2 MIMO operation, each of the TX paths 210 and 230 function as the transmit path for one of the MIMO channels, and each of the RX paths 220 and 240 functions as the receive path for one of the MIMO channels. The combination of a TX path and RC path aligned with each other to receive, carry, and repeat, UL or DL MIMO channels via the repeater 120, is referred to herein as a bidirectional MIMO signal path.

Figure 3:
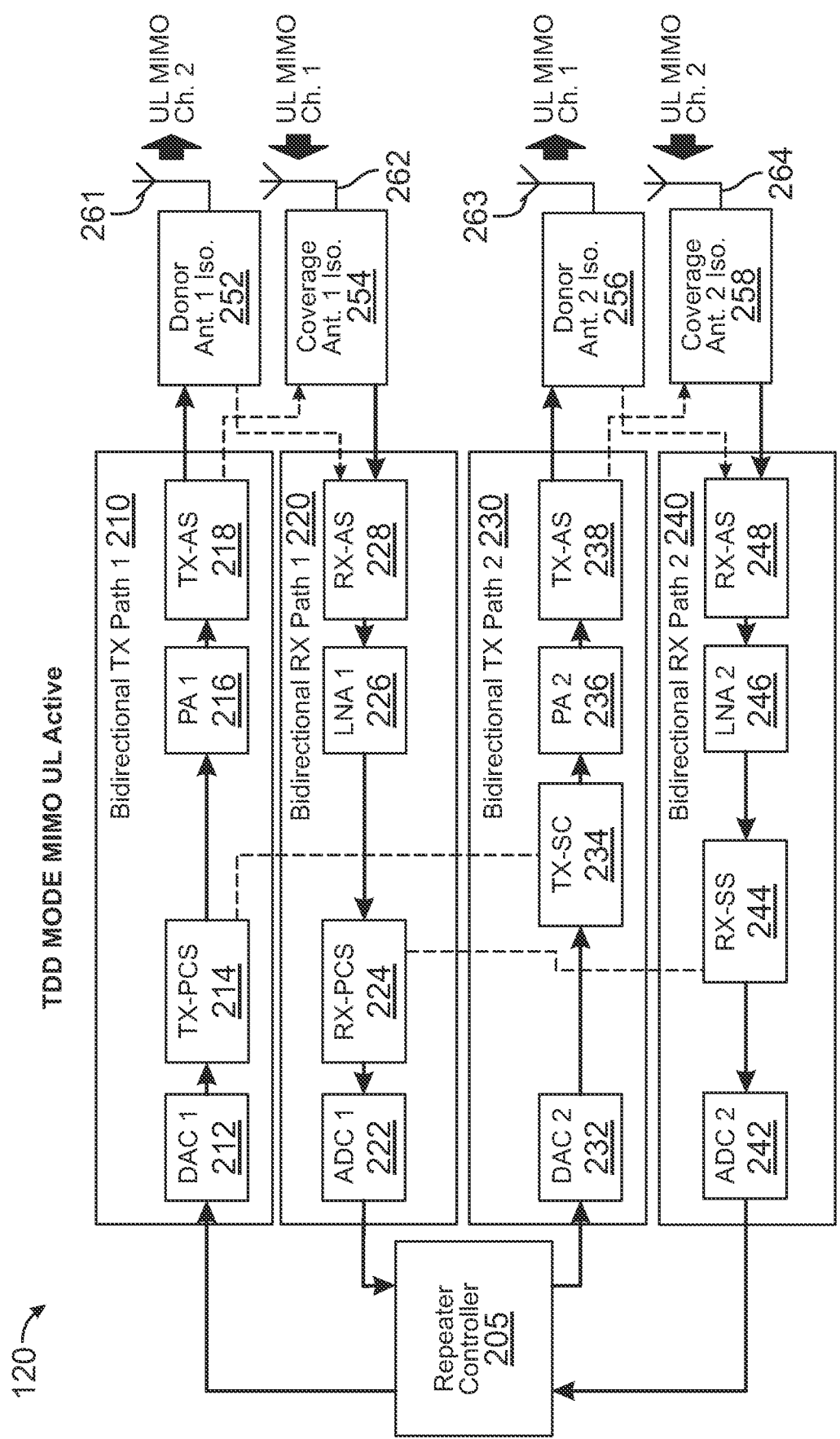
FIG. 3 is a diagram of an example TDD SISO/MIMO configurable repeater in a TDD MIMO uplink mode configuration.

FIG. 3 is a block diagram that illustrates the repeater 120 of FIG. 2 in 2×2 MIMO operation for repeating UL transmissions from the UE 122 to the one or more base stations 110. In this example, one or more TDD UE uplink radio frequency signals comprising UL MIMO channels 1 and 2 are received by the antennas 262 and 264. In this configuration, the antenna selector switch (RX-AS) 228 is switched to couple the antenna 262 to the bidirectional RX path 220 for processing the UL MIMO channel 1 signal. The analog RF signal is processed by the LNA 226, is passed through the switch 224, is converted to digital by the ADC 222, and is input to the repeater controller 205 for further signal processing. The repeater controller 205 outputs the processed UL MIMO channel 1 (which now defines a repeated uplink RF signal comprising MIMO channel 1) to the bidirectional TX path 230. Within the bidirectional TX path 230, the repeated uplink RF signal is converted to an analog signal by the DAC 232, is passed through the signal combiner 234, and is amplified for wireless transmission by the PA 236. The antenna selector switch (TX-AS) 238 is switched to couple the antenna 263 to the bidirectional TX path 230. The antenna 263 radiates the repeated uplink RF signal carrying MIMO channel 1 to the base station 110.

The selector switch (RX-AS) 248 is switched to couple the antenna 264 to the bidirectional RX path 240 for processing the UL MIMO channel 2 signal. The analog RF signal is processed by the LNA 246, is passed through the signal splitter 244, is converted to digital by the ADC 242, and input to the repeater controller 205 for further signal processing. The repeater controller 205 outputs the processed UL MIMO channel 2 (which now defines a repeated uplink RF signal comprising MIMO channel 2) to the bidirectional TX path 210. Within the bidirectional TX path 210, the repeated uplink RF signal is converted to an analog signal by the DAC 212, is passed through the switch 214, and is amplified for wireless transmission by the PA 216. The antenna selector switch (TX-AS) 218 is switched to couple the antenna 261 to the bidirectional TX path 210. Antenna 261 radiates the repeated uplink RF signal carrying MIMO channel 2 to the base station 110.

Figure 4:
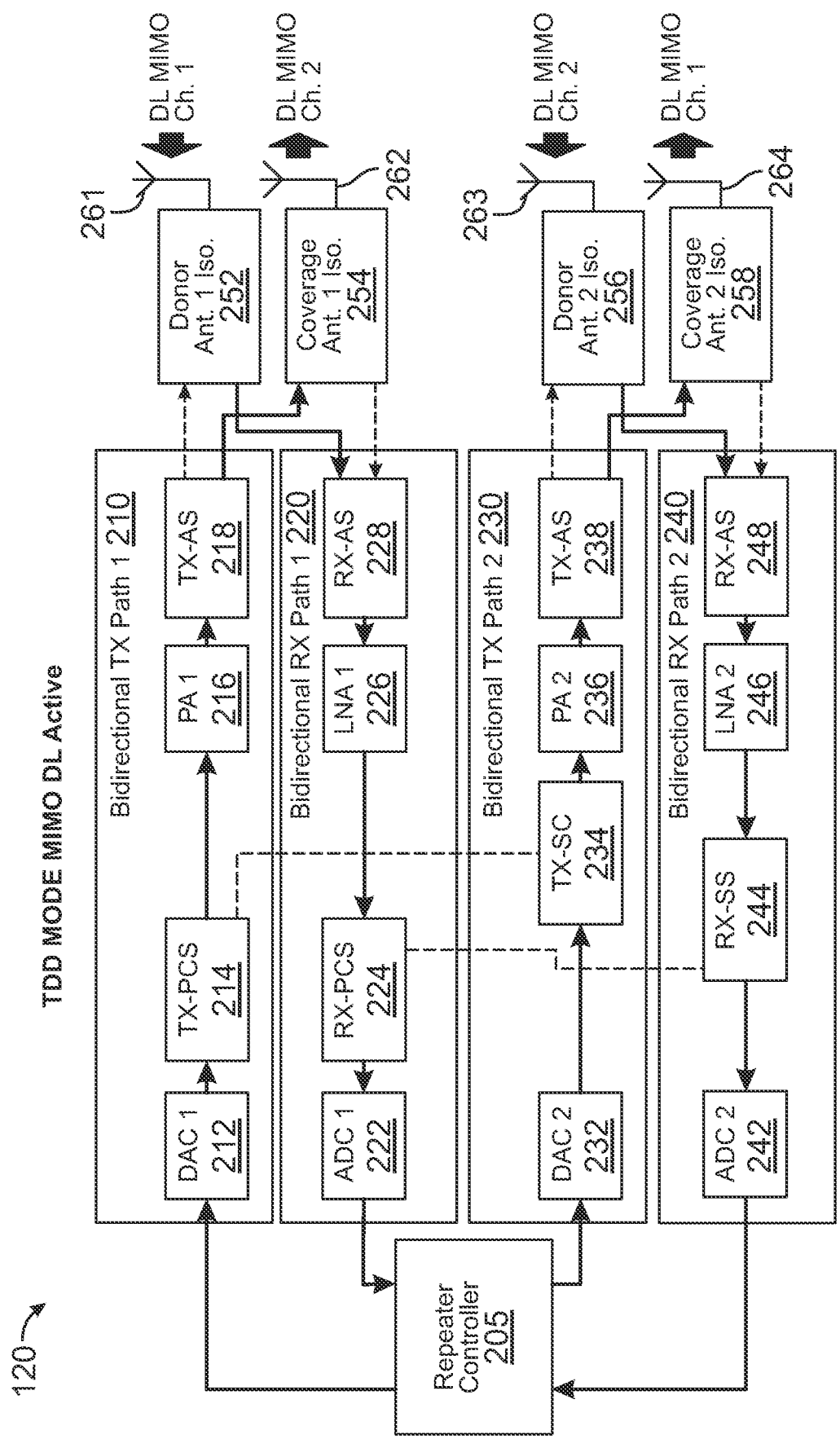
FIG. 4 is a diagram of an example TDD SISO/MIMO configurable repeater in a TDD MIMO downlink mode configuration.

FIG. 4 is a block diagram illustrating the repeater 120 of FIG. 2 in 2×2 MIMO operation for repeating TDD DL transmissions from the one or more base stations 110 to the UE 122. In this example, one or more base station downlink RF signals comprising DL MIMO channels 1 and 2 are received by the antennas 261 and 263. For repeating DL transmissions, the RX-AS 228 is switched to couple the antenna 261 to the bidirectional RX path 220 for processing the DL MIMO channel 1 signal. The analog RF signal is processed by the LNA 226, is passed through the switch 224, is converted to digital by the ADC 222, and is input to the repeater controller 205 for further signal processing. The repeater controller 205 outputs the processed DL MIMO channel 1 (which now defines a repeated downlink RF signal comprising MIMO channel 1) to the bidirectional TX path 230. Within the bidirectional TX path 230, the repeated downlink RF signal is converted to an analog signal by the DAC 232, is passed through the signal combiner 234, and is amplified for wireless transmission by the PA 236. The TX-AS 238 is switched to couple the antenna 264 to the bidirectional TX path 230. The antenna 264 radiates the repeated downlink signal carrying MIMO channel 1 into the coverage area 121 for reception by UE 122.

For the bidirectional RX path 240, the RX-AS 248 is switched to couple the antenna 263 to the bidirectional RX path 240 for processing the DL MIMO channel 2 signal. The analog RF signal is processed by the LNA 246, is passed through the signal splitter 244, is converted to digital by the ADC 242, and input to the repeater controller 205 for further signal processing. The repeater controller 205 outputs the processed DL MIMO channel 2 (which now defines a repeated downlink RF signal comprising MIMO channel 2) to the bidirectional TX path 210. Within the bidirectional TX path 210, the repeated uplink RF signal is converted to an analog signal by the DAC 212, is passed through the switch 214, and is amplified for wireless transmission by the PA 216. The TX-AS 218 is switched to couple the antenna 262 to the bidirectional TX path 210. The antenna 262 radiates the repeated downlink signal carrying MIMO channel 2 into the coverage area 121 for reception by the UE 122.

The switching of the repeater 120 between the MIMO UL and MIMO DL operation thus comprises the operation of the antenna switches 218, 228, 238, and 248 to align the antennas. During MIMO operation, the antennas 261 and 263 effectively function together as the repeater donor MIMO antennas, and the antennas 262 and 264 effectively function together as the repeater coverage MIMO antennas. Switching of the antenna switches 218, 228, 238, and 248 is controlled by the repeater controller 205 and synchronized with the UL and DL frame transmission schedule of the one or more base stations 110.

The system gains applied by the PA 216 and 236 for the bidirectional TX paths 210 and 230 are reconfigurable by the repeater controller 205. The system gains applied by the LNA 226 and 246 for the bidirectional RX paths 220 and 240 are also reconfigurable by the repeater controller 205. By dynamically configuring the gain settings of the PAs 216 and 236 and the LNAs 226 and 246, repeated uplink RF signals and repeated downlink RF signals are each transmitted by the repeater 120 at their respective desired (predetermined) power levels. Gain adjustments using both the PAs and LNAs permit adjustments that keep the balance between linearity and noise figure and may be utilized to keep the DACs and ADCs at the operating point for good dynamic range. In some embodiments, received DL reference signals are decoded by the repeater controller 205 from the received base station downlink RF signals to determine the system gain settings for the PAs 216 and 236 and the LNAs 226 and 246 for the repeater to transmit at the desired DL and/or UL output power. Once determined, the repeater controller 205 uses the gain settings to configure the PAs 216 and 236 and the LNAs 226 and 246.

The corresponding system gain settings for a balanced DL/UL link budget can be utilized for MIMO UL operation and applied to the PAs 216 and 236 and the LNAs 226 and 246. In other embodiments, the repeater 120 may apply different UL and DL gain settings for the PAs 216 and 236 stored in memory and loaded into the PAs 216 and 236 and the LNAs 226 and 246 when the repeater switches between UL and DL operation. Depending on the repeater's deployment environment, the RF characteristics applied for UL operation might be configured by the repeater controller 205 to reflect either a high linearity (for example, a high Input Third-Order Intercept Point) or a low noise figure. Thus, the signal line-up between MIMO DL operation and MIMO UL operation can differ, although the overall system gain is balanced. Again, settings to achieve these configurations may be stored in memory and retrieved and applied when the repeater switches between MIMO UL and MIMO DL operation.

In some embodiments, the repeater controller 205 may implement different digital power control mechanisms in MIMO DL versus MIMO UL operation mode. For MIMO DL mode, a slow power detection mechanism may be executed to determine the exact power value of received signals. For example, it might be advantageous to determine the actual power of the received signal over several DL time-slots. However, in UL mode, a fast power detection would be preferable to protect the bidirectional receiver paths 220 and 240 from strong UE uplink radio frequency signals. In some embodiments, the repeater controller 205 may execute one or more digital compressor techniques (for example, for dBFS measurement of the UE uplink radio frequency signals, etc.). In some embodiments, the DL operation may be configured by a user and/or operator of the repeater 120 in real-time with a desired nominal gain setting and the UL operation configured to have a corresponding gain. In this gain mode, the repeater UL and DL gain is kept constant and independent of the signal strength of incoming signals. The exception would be when the composite power of an incoming base station downlink signal exceeds a given composite power from the TX paths 210 and 230.

As discussed above, using at least some of the same circuitry used for MIMO operation, the repeater 120 can be reconfigured for extended bandwidth SISO operation.

Reconfiguration from MIMO to SISO operation is executed by operating the transmit path combiner switch (TX-PCS) 214 to link signal paths of the bidirectional TX path 210 and bidirectional TX path 230, and by operating the receive path combiner switch (RX-PCS) 224 to link the signal paths of bidirectional RX path 220 and bidirectional RX path 240.

When the repeater 120 is configured for extended bandwidth SISO operation, the received signals are split between ADC 222 and ADC 242, which operate in parallel to convert different portions of the received signal bandwidth to two sets of digital signals. The repeater controller 205 processes the two sets of digital signals and outputs two sets of repeated digital signals to the DAC 212 and DAC 232. The resulting analog signals are combined and amplified by a PA for transmission as a repeated wireless RF signal. As mentioned above, in some embodiments, the components of the bidirectional TX paths 210 and 230 (such as PA 216 and PA 236) and bidirectional RX paths 220 and 240 (such as LNA 226 and LNA 246) are capable of transporting RF signals of up to a predetermined bandwidth (e.g., a 200 MHz bandwidth), with the DACs 212 and 232 and ADCs 222 and 242 each capable of processing at least half of that bandwidth (e.g., a 100 MHz bandwidth). Operation in extended SISO mode can now be described in more detail with reference to FIGS. 5 and 6.

Figure 5:
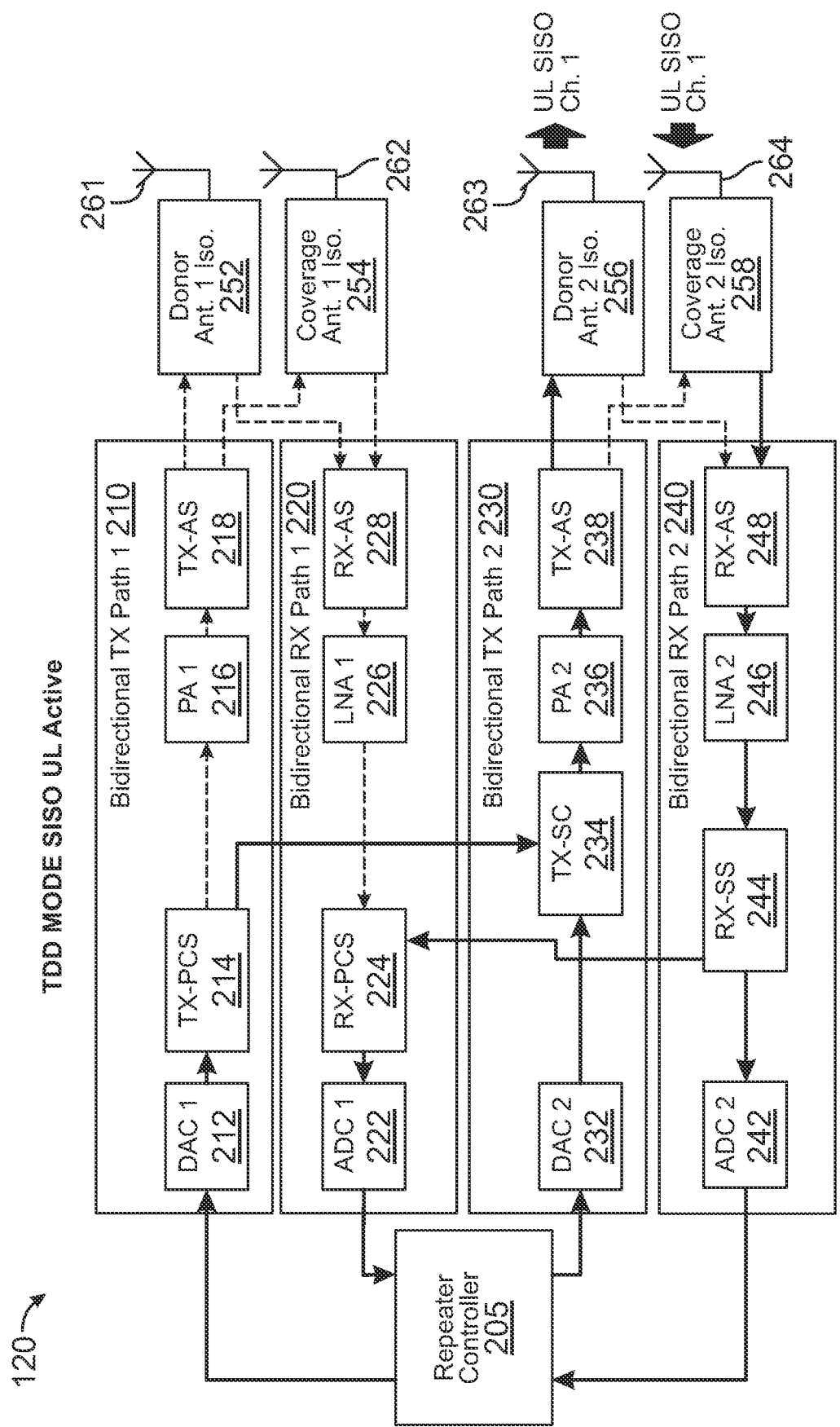
FIG. 5 is a diagram of an example TDD SISO/MIMO configurable repeater in a TDD extended bandwidth SISO uplink mode configuration.

FIG. 5 is a block diagram that illustrates the repeater 120 of FIG. 2 configured for extended SISO operation for repeating UL SISO transmissions from the UE 122 to the one or more base stations 110. In this example, one or more TDD UE uplink radio frequency signals comprising a UL SISO channel are received by the antenna 264. In this configuration, the antenna selector switch (RX-AS) 248 is switched to couple the antenna 264 to the bidirectional RX path 240 for processing the UL SISO signal. The analog RF signal is processed by the LNA 246 and passed to the RX-SS 244, where the signal is split, with a first portion of the signal routed to the ADC 242 and a second portion of the signal routed to the ADC 222 of the bidirectional RX path 220. The ADCs 242 and 222 operate in parallel to convert different portions of the received signal bandwidth into two sets of digital signals. The ADC 242 converts the first portion of the received signal to a first set of digital signals provided to the repeater controller 205. The second portion of the received signal is coupled to the RX-PCS 224, which is switched to couple the second portion to the ADC 222. The ADC 222 converts the second portion of the received signal to a second set of digital signals provided to the repeater controller 205.

In response to receiving the first and second sets of digital signals, the repeater controller 205 processes the two sets of digital signals and outputs two sets of repeated digital signals to the DAC 212 and DAC 232. The first set of repeated digital signals is converted to analog by the DAC 212. The TX-PCS 214 of bidirectional TX path 210 is now switched to route the output of the DAC 212 to the TX-SC 234 of the bidirectional TX path 230. The second set of repeated digital signals is converted to analog by the DAC 232, and the analog output of the DAC 232 is also passed to the TX-SC 234. The TX-SC 234 combines the analog output from the DAC 212 with the analog output from the DAC 232. The combined output forms the repeated uplink RF signal, which is amplified for wireless transmission by the PA 236. The antenna selector switch (TX-AS) 238 is switched to couple the antenna 263 to the bidirectional TX path 230. Antenna 263 radiates the repeated uplink RF signal carrying the UL SISO channel to the base station 110.

Figure 6:
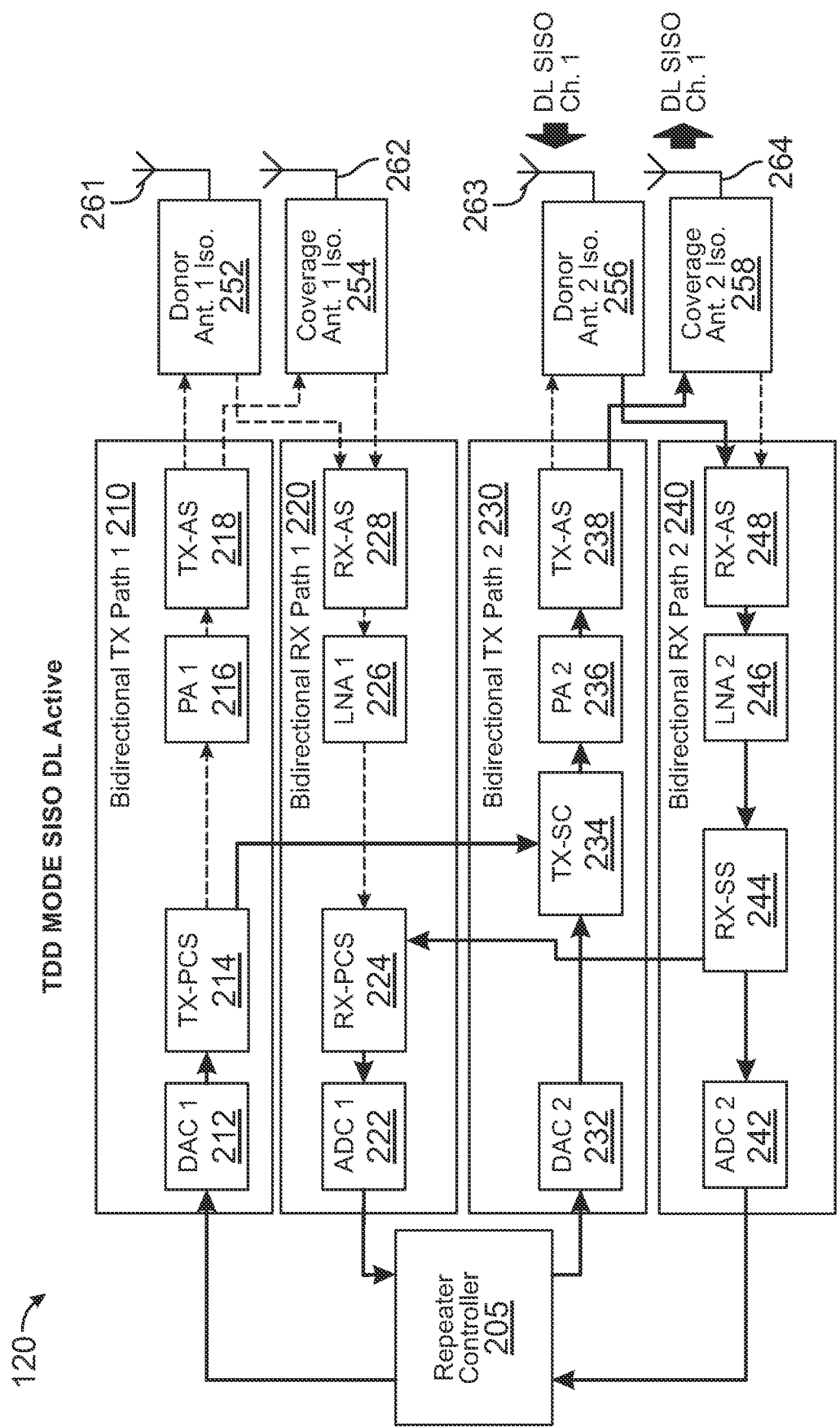
FIG. 6 is a diagram of an example TDD SISO/MIMO configurable repeater in a TDD extended bandwidth SISO downlink mode configuration.

FIG. 6 is a block diagram that illustrates the repeater 120 of FIG. 2 configured for extended SISO operation for repeating DL transmissions from the one or more base stations 110 to UE 122 within the coverage area 121. In this example, one or more TDD base station downlink RF signals comprising a DL SISO channel are received by the antenna 263. In this configuration, the antenna selector switch (RX-AS) 248 is switched to couple the antenna 263 to the bidirectional RX path 240 for processing the DL SISO signal. The analog RF signal is processed by the LNA 246 and passed to the RX-SS 244, where the signal is split with a first portion of the signal routed to the ADC 242 and a second portion of the signal routed to the ADC 222 of the bidirectional RX path 220. The ADCs 222 and 242 operate in parallel to convert different portions of the received signal bandwidth into two sets of digital signals. The ADC 242 converts the first portion of the received signal to a first set of digital signals provided to the repeater controller 205. The second portion of the received signal is coupled to the RX-PCS 224, which is now switched to couple the second portion to the ADC 222. The ADC 222 converts the second portion of the received signal to a second set of digital signals provided to the repeater controller 205.

In response to receiving the first and second sets of digital signals, the repeater controller 205 processes the two sets of digital signals and outputs two sets of repeated digital signals to the DAC 212 and DAC 232. The first set of repeated digital signals is converted to analog by the DAC 232, and the analog output of the DAC 232 is passed to the TX-SC 234. The second set of repeated digital signals is converted to analog by the DAC 212. The TX-PCS 214 of the bidirectional TX path 210 is now switched to route the output of the DAC 212 to the TX-SC 234 of the bidirectional TX path 230. The TX-SC 234 combines the analog output from the DAC 212 with the analog output from the DAC 232, and the combined output forms the repeated downlink RF signal, which is amplified for wireless transmission by the PA 236. The antenna selector switch (TX-AS) 238 is switched to couple the antenna 264 to the bidirectional TX path 230. Antenna 264 radiates the repeated downlink RF signal carrying the DL SISO channel to the UE 122 of the coverage area 121.

When the repeater is configured for extended SISO operation, the repeater controller 205 operates the TX-PCS 214 and RX-PCS 224 to obtain the configuration described above. Moreover, the repeater controller 205 reconfigures the ADC 222, 242, and DAC 212, 232 to perform their conversion operations on the assigned segments of the received SISO signal bandwidth. For example, the repeater controller 205 may configure the ADC 242 to convert the lower half of the SISO signal bandwidth to the first set of digital signals and configure the ADC 222 to convert the upper half of the SISO signal bandwidth to the second set of digital signals. Similarly, the repeater controller 205 may configure the DAC 232 to convert the first set of repeated digital signals for the upper half of the SISO signal bandwidth and configure the DAC 212 to convert the second set of repeated digital signals for the lower half of the SISO signal bandwidth.

As was the case for MIMO operation, in SISO operation electronic components, including the power amplifiers and converters of the bidirectional TX and RX paths, are shared and utilized for processing both uplink and downlink signals.

In extended bandwidth SISO operation, the switching of the repeater 120 between the SISO UL and SISO DL operation comprises the operation of the antenna switches 238 and 248 to align the antennas with the appropriate signal path. Switching of the antenna switches 238 and 248 is controlled by the repeater controller 205 and synchronized with the UL and DL frame transmission schedule of the one or more base stations 110. As was the case for MIMO operation, in extended bandwidth SISO operation, the system gains applied by the PA 236 are reconfigurable by the repeater controller 205. That is, by configuring the gain settings of the PA 236, repeated uplink RF signals and repeated downlink RF signals are each transmitted by the repeater 120 at their respective desired power levels. During DL operation, in some embodiments, DL reference signals are decoded by the repeater controller 205 from the received base station downlink RF signals to determine the system gain settings for the PA 236 for the repeater 120 to transmit at the desired DL output power. The repeater controller 205 uses the gain settings to configure the PA 236. For a balanced DL/UL link budget, the corresponding system gain settings can be utilized for SISO UL operation and applied to the PA 236. In other embodiments, the repeater 120 may apply different UL and DL gain settings for the PA 236 stored in memory and loaded into the PA 236 when the repeater switches between UL and DL operation. Depending on the repeater's deployment environment, the RF characteristics applied for UL operation might be configured by the repeater controller 205 to reflect either a high linearity (for example, a high Input Third-Order Intercept Point) or a low noise figure. The signal line-up between extended bandwidth SISO DL operation and extended bandwidth SISO UL operation can differ, although the overall system gain is balanced. Again, settings to achieve these configurations may be stored in memory and retrieved and applied when the repeater 120 switches between MIMO UL and MIMO DL operation.

In some embodiments, the repeater controller 205 may implement different digital power control mechanisms in MIMO DL versus MIMO UL operation mode. For MIMO DL mode, a slow power detection mechanism may be executed to determine the exact power value of received signals. For example, it might be advantageous to determine the actual power of the received signal over several DL time-slots. However, in UL mode, a fast power detection would be preferable to protect the bidirectional receiver paths 220 and 240 from strong UE uplink radio frequency signals. In some embodiments, the repeater controller 205 may execute one or more digital compressor techniques (for example, for dBFS measurement of the UE uplink radio frequency signals, etc.). In some embodiments, the DL operation may be configured by a user and/or operator of the repeater 120 in real-time with a desired nominal gain setting and the UL operation configured to have a corresponding gain. In this gain mode, the repeater UL and DL gain is kept constant and independent of the signal strength of incoming signals. The exception would be where the composite power of an incoming base station downlink signal exceeds a given composite power from the TX path 230.

Figure 7:
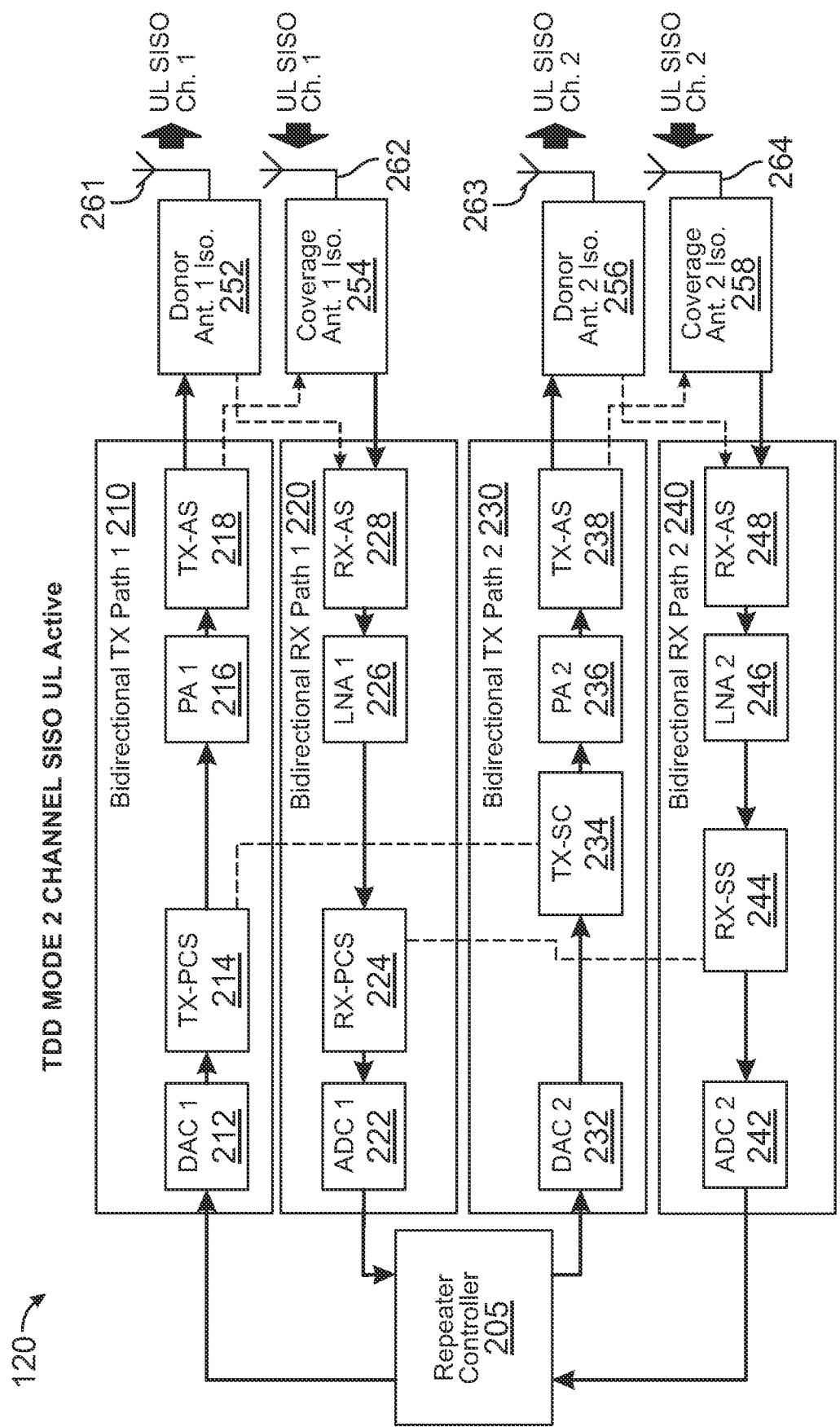
FIG. 7 is a diagram of an example TDD SISO/MIMO configurable repeater in a TDD two-channel SISO uplink mode configuration.
Figure 8:
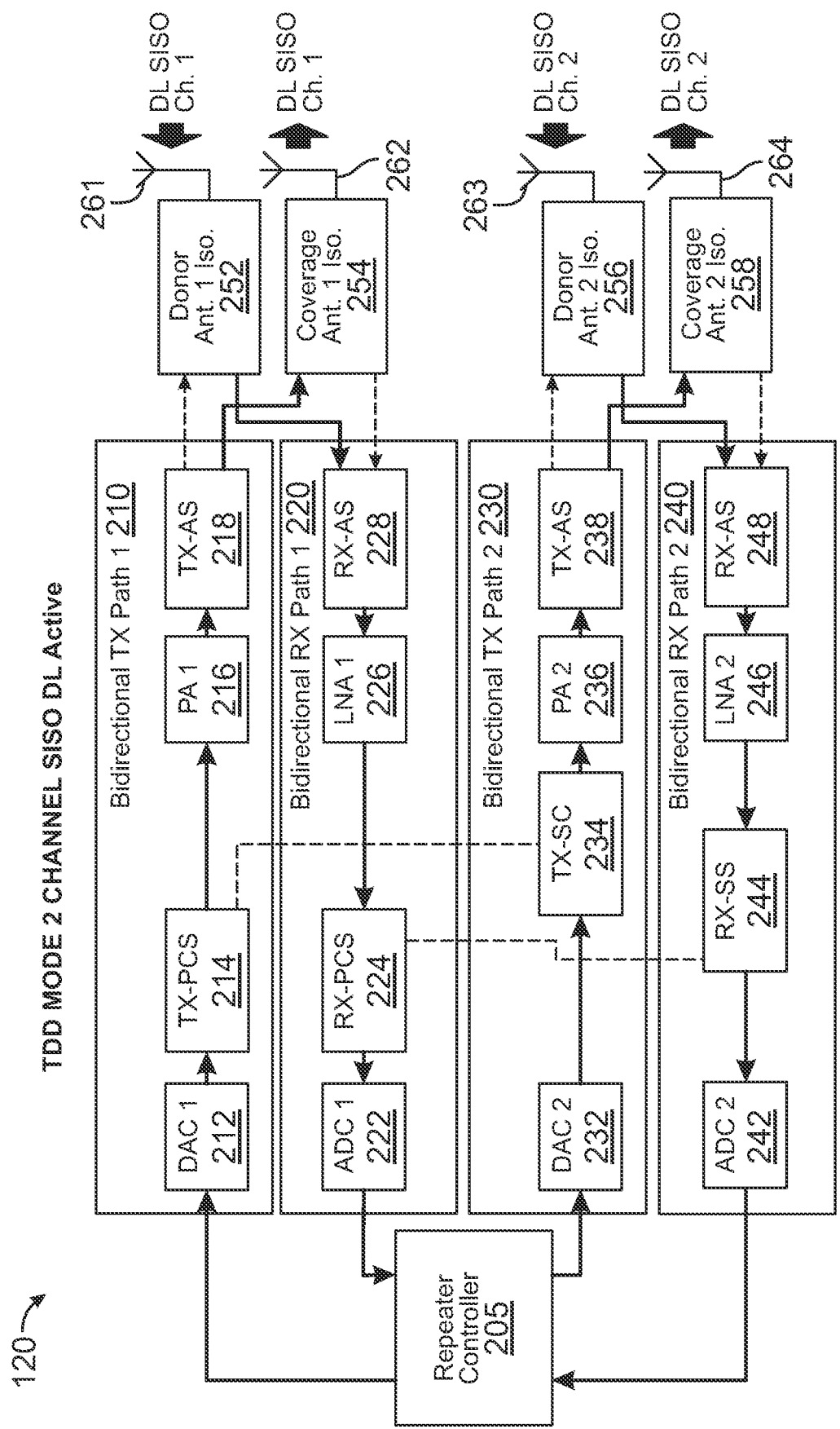
FIG. 8 is a diagram of an example TDD SISO/MIMO configurable repeater in a TDD two-channel SISO downlink mode configuration.

In still other embodiments, SISO operation may be configured without extended bandwidth, as shown in FIGS. 7 and 8. In this embodiment, the repeater controller 205 is programmed to implement a repeater comprising independent signal paths for two parallel SISO channels (for example, for repeating SISO signals transmitted on different 100 MHz frequency channels). In this embodiment, where the repeater 120 is configured for two-channel SISO operation, the electronic components of the bidirectional TX and RX paths are utilized for processing both uplink and downlink signals.

FIG. 7 is a block diagram that illustrates the repeater 120 of FIG. 2 configured for two-channel SISO operation for repeating two channels of UL SISO transmissions from the UE 122 to the one or more base stations 110. In this example, a first UE uplink radio frequency signal comprising a first UL SISO channel (referred to as SISO channel 1) is received by the antenna 262. In this configuration, the antenna selector switch (RX-AS) 228 is switched to couple the antenna 262 to the bidirectional RX path 220 for processing the UL SISO channel 1 signal. The analog RF signal is processed by the LNA 226, is passed through the RX-PCS 224, is converted to digital by the ADC 222, and is provided to the repeater controller 205 for further signal processing. The repeater controller 205 outputs the processed UL SISO channel 1 (which now defines a repeated uplink RF signal comprising MIMO channel 1) to the bidirectional TX path 210. Within the bidirectional TX path 210, the repeated uplink RF signal is converted to an analog signal by the DAC 212, is passed through the switch 214, and is amplified for wireless transmission by the PA 216. The antenna selector switch (TX-AS) 218 is switched to couple the antenna 261 to the bidirectional TX path 210. Antenna 261 radiates the repeated uplink RF signal carrying the UL SISO channel 1 to the base station 110.

Further, a second UE uplink radio frequency signal comprising a second UL SISO channel (referred to as SISO channel 2) is received by the antenna 264. The selector switch (RX-AS) 248 is switched to couple the antenna 264 to the bidirectional RX path 240 for processing the UL SISO channel 2 signal. The analog RF signal is processed by the LNA 246, is passed through the signal splitter 244, is converted to digital by the ADC 242, and is provided to the repeater controller 205 for further signal processing. The repeater controller 205 outputs the processed UL SISO channel 2 (which now defines a repeated uplink RF signal comprising SISO channel 2) to the bidirectional TX path 230. Within the bidirectional TX path 230, the repeated uplink RF signal is converted to an analog signal by the DAC 232, is passed through the signal combiner 234, and is amplified for wireless transmission by the PA 236. The antenna selector switch (TX-AS) 238 is switched to couple the antenna 263 to the bidirectional TX path 230. The antenna 263 radiates the repeated uplink RF signal carrying the UL SISO channel 2 to the base station 110.

FIG. 8 is a block diagram that illustrates the repeater 120 of FIG. 2 configured for two-channel SISO operation for repeating two channels of DL SISO transmissions from the one or more base stations 110 to the UE 122 in coverage area 121. In this example, a first base station downlink signal comprising a first DL SISO channel (referred to as SISO channel 1) is received by the antenna 261. The RX-AS 228 is now switched to couple the antenna 261 to the bidirectional RX path 220 for processing the DL SISO channel 1 signal. The analog RF signal is processed by the LNA 226, is passed through the switch 224, is converted to digital by ADC 222, and is provided to the repeater controller 205 for further signal processing. The repeater controller 205 outputs the processed DL SISO channel 1 (which now defines a repeated downlink RF signal comprising the DL SISO channel 1) to the bidirectional TX path 210. Within the bidirectional TX path 210, the repeated downlink RF signal is converted to an analog signal by the DAC 212, is passed through the switch 214, and is amplified for wireless transmission by the PA 216. The TX-AS 218 is now switched to couple the antenna 262 to the bidirectional TX path 210. The antenna 262 radiates the repeated DL signal carrying SISO channel 1 into the coverage area 121 for reception by the UE 122.

A second base station downlink signal comprising a second DL SISO channel (referred to as SISO channel 2) is received by the antenna 263. RX-AS 248 is now switched to couple the antenna 263 to the bidirectional RX path 240 for processing the DL MIMO channel 2 signal. The analog RF signal is processed by the LNA 246, is passed through the signal splitter 244, is converted to digital by the ADC 242, and is provided to the repeater controller 205 for further signal processing. The repeater controller 205 outputs the processed DL MIMO channel 2 (which now defines a repeated downlink RF signal comprising MIMO channel 2) to the bidirectional TX path 230. Within the bidirectional TX path 230, the repeated downlink signal is converted to an analog signal by the DAC 232, is passed through the signal combiner 234, and is amplified for wireless transmission by the PA 236. The TX-AS 238 is switched to couple the antenna 264 to the bidirectional TX path 230. The antenna 264 radiates the repeated downlink signal carrying SISO channel 2 into the coverage area 121 for reception by the UE 122.

Unlike the MIMO channels discussed above that can be communicated as overlapping signals within the same frequency band without causing interference with each other, the SISO channels 1 and 2 cannot be communicated as overlapping signals but instead are communicated over separate frequency bands. In the two-channel SISO configuration illustrated in FIGS. 7 and 8, the repeater controller 205 is configured internally to process the different frequency bands for the SISO channels 1 and 2, allowing for a wider bandwidth to be configured. In some embodiments, the repeater controller 205 further configures the components of the bidirectional TX and RX paths for the frequency bands utilized for the SISO channels 1 and 2. Switching of the antenna switches 238 and 248 is controlled by the repeater controller 205 and synchronized with the UL and DL frame transmission schedule of the one or more base stations 110. However, in the two-channel SISO configuration, the switching of the signal paths for each SISO channel may be independent of each other.

The system gains applied by the PA 216 and 236 for the bidirectional TX paths 210 and 230 are reconfigurable by the repeater controller 205. The system gains applied by the LNA 226 and 246 for the bidirectional RX paths 220 and 240 are also reconfigurable by the repeater controller 205. By dynamically configuring the gain settings of the PAs 216 and 236 and the LNAs 226 and 246, repeated uplink RF signals and repeated downlink RF signals are each transmitted by the repeater 120 at their respective desired (predetermined) power levels. Gain adjustments using both the PAs and LNAs permit adjustments that keep the balance between linearity and noise figures and may be utilized to keep the DACs and ADCs at the operating point for good dynamic range. During DL operation, in some embodiments, DL reference signals for each of the SISO channels are decoded by the repeater controller 205 from the received base station downlink RF signals to determine the system gain settings for the PAs 216 and 236 and the LNAs 226 and 246. Once determined, the repeater controller 205 uses the gain settings to configure the PAs 216 and 236 and the LNAs 226 and 246.

For a balanced DL/UL link budget, the corresponding system gain settings for each SISO channel can be utilized for SISO UL operation and applied to the PAs 216 and 236 and the LNAs 226 and 246. In other embodiments, the repeater 120 may apply different UL and DL gain settings for the PAs 216 and 236 and the LNAs 226 and 246, that are stored in memory and loaded into the PAs 216 and 236 and the LNAs 226 and 246 when the repeater switches between UL and DL operation. Depending on the repeater's deployment environment, the RF characteristics applied for UL operation might be configured by the repeater controller 205 to reflect either a high linearity (for example, a high Input Third-Order Intercept Point) or a low noise figure. Thus, the signal line-up between SISO DL operation and SISO UL operation can differ, although the overall system gain is balanced. Settings to achieve these configurations may be stored in memory and retrieved and applied when the repeater switches between MIMO UL and MIMO DL operation.

In some embodiments, the repeater controller 205 may implement different digital power control mechanisms in MIMO DL versus MIMO UL operation mode. For MIMO DL mode, a slow power detection mechanism may be executed to determine the exact power value of received signals. For example, it might be advantageous to determine the actual power of a received signal over several DL time-slots. However, in UL mode, a fast power detection would be preferable to protect the bidirectional receiver paths 220 and 240 from strong UE uplink radio frequency signals. In some embodiments, the repeater controller 205 may execute one or more digital compressor techniques (for example, for dBFS measurement of the UE uplink radio frequency signals, etc.). In some embodiments, the DL operation may be configured by a user and/or operator of the repeater 120 in real-time with a desired nominal gain setting and the UL operation configured to have a corresponding gain. That is, in this gain mode, the repeater UL and DL gain for the respective SISO channels can be kept constant and independent of the signal strength of incoming signals. The exception would be for the case where the composite power of an incoming base station downlink signal would exceed a given composite power from the TX paths 210, 230.

There are several band combinations where the same spectrum is used in one region for TDD communications and an adjacent region for FDD communication. For example, in some embodiments, the repeater 120 may be implemented to provide the coverage area 121 within a moving platform, such as a train that drives from one country to another. For example, the 3GPP Band 22 FDD comprises the frequency range of 3410-3490 MHz for uplink transmissions and 3510-3590 MHz for downlink transmission. The 3GPP Band 42 TDD comprises the frequency band 3400-3600 MHz for uplink and downlink transmission, which overlaps the spectrum of the 3GPP Band 22 FDD. Accordingly, in some embodiments, the repeater 120 described above may be augmented with an FDD/TDD switching hardware module comprising adjustable or configurable filters or duplexers that can be adjusted for the TDD or FDD operation compatible with the region in which the repeater 120 is located. An embodiment of one such FDD/TDD switching circuit is illustrated in FIG. 9.

Figure 9:
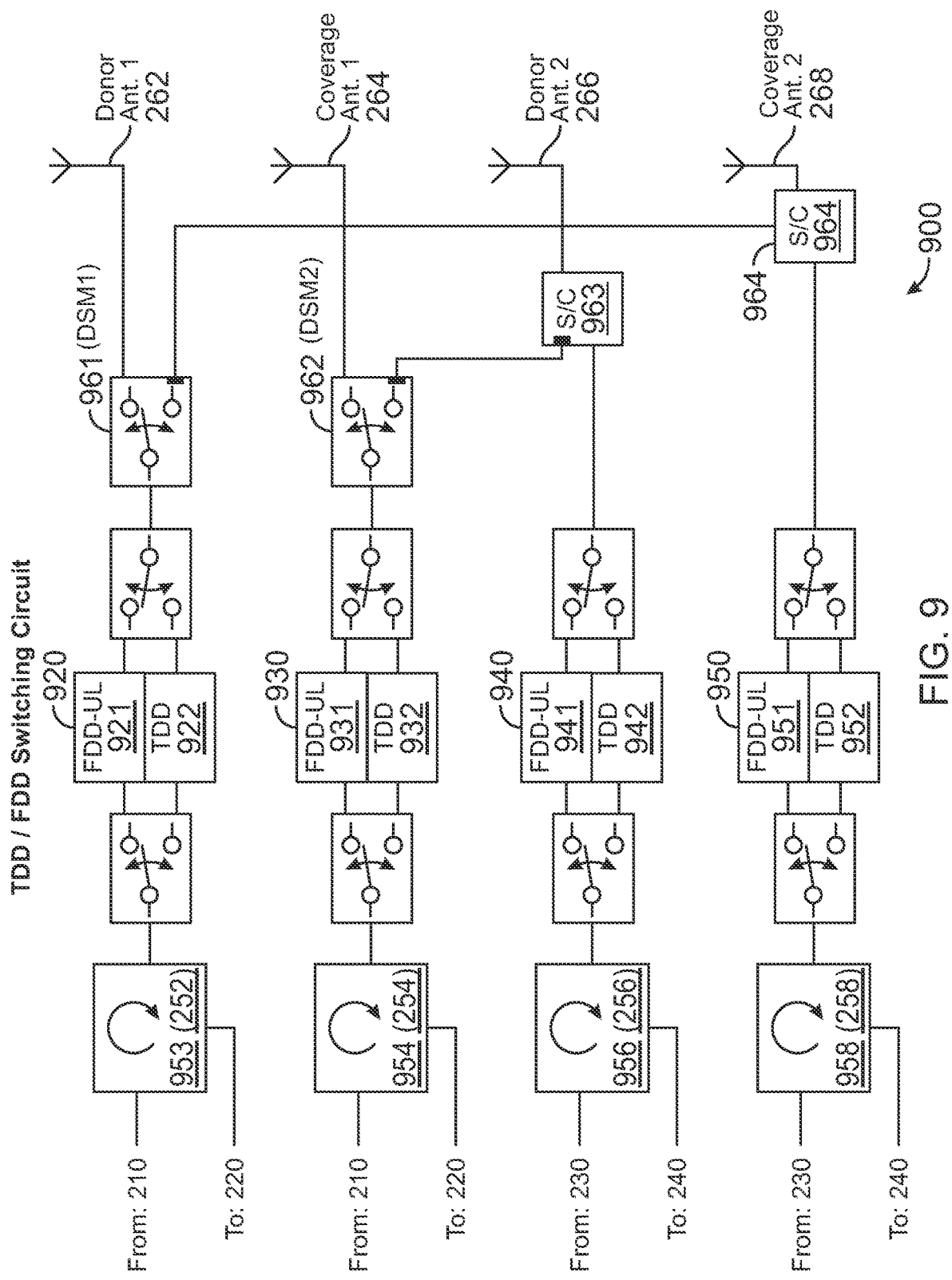
FIG. 9 is a diagram of an example TDD/FDD switching circuit for a TDD SISO/MIMO configurable repeater.

FIG. 9 is a block diagram illustrating an FDD/TDD switching circuit 900 that can be used to adapt the repeater 120 for TDD or FDD operation compatible with the region in which the repeater 120 is located. In this embodiment, each of the antenna isolation circuits is coupled to the antennas 262, 264, 266, and 268 via switchable filter sets 920, 930, 940, and 950. In this embodiment, the antenna isolation circuits 953, 954, 956, and 958 correspond to the isolation elements (e.g., such as the circulator or switch) of the respective antenna isolation circuits 252, 254, 256, and 258 and the filter switchable filter sets 920, 930, 940, and 950 take the place of the antenna isolation circuit filters shown in FIGS. 2A-2D.

Filter set 920 is coupled to the antenna isolation circuit 252 and comprises an FDD DL band filter 921 (for example, a Band 22 DL band filter that passes 3510-3590 MHz for downlink transmission) and a TDD band filter 922 (for example, a Band 42 filter that passes 3400-3600 MHz). Filter set 930 is coupled to the antenna isolation circuit 254 and comprises an FDD DL band filter 931 (for example, a Band 22 DL band filter that passes 3510-3590 MHz for downlink transmission) and a TDD band filter 932 (for example, a Band 42 filter that passes 3400-3600 MHz). Filter set 940 is coupled to the antenna isolation circuit 256 and comprises an FDD UL band filter 941 (for example, a Band 22 UL band filter that passes 3410-3490 MHz for uplink transmission) and a TDD band filter 942 (for example, a Band 42 filter that passes 3400-3600 MHz). Filter set 950 is coupled to the antenna isolation circuit 258 and comprises an FDD UL band filter 951 (for example, a Band 22 UL band filter that passes 3410-3490 MHz for uplink transmission) and a TDD band filter 952 (for example, a Band 42 filter that passes 3400-3600 MHz).

When repeater 120 is operating in TDD mode, the FDD/TDD switching circuit 900 is configured so that the TDD band filters 922, 932, 942, and 952 are selected to pass RF signals between the respective antenna isolation circuit and antenna. Moreover, duplex mode switches 961 (DMS1) and 962 (DMS2) are switched to their TDD state so that the TDD band filter 922 is coupled to antenna 262, the TDD band filter 932 is coupled to antenna 264, TDD band filter 942 is coupled to antenna 266, and TDD band filter 952 is coupled to antenna 268. The repeater 120 operates in the same manner as described in the embodiments above.

When repeater 120 is operating in FDD mode, the FDD/TDD switching circuit 900 is configured so that the FDD band filters 921, 931, 941, and 951 are selected to pass RF signals between the respective antenna isolation circuit and antenna. In FDD mode, duplex mode switches 961 and 962 are switched to their FDD state so that the FDD DL band filter 921 and the FDD UL filter 951 are both coupled to coverage antenna 268 via splitter/combiner 964, and the FDD DL band filter 931 and the FDD UL filter 941 are both coupled to donor antenna 266 via splitter/combiner 963. Accordingly, a base station downlink signal received from the base station 110 at the donor antenna 266 in the downlink band is be passed by the FDD DL band filter 931 to the bidirectional RX path 220 but filtered out and not passed by the FDD UL band filter 941 to the bidirectional RX path 240. The repeater controller 205 outputs the repeated digital downlink signal to the bidirectional TX path 210, which passes the resulting analog repeated RF downlink signal (via the FDD DL band filter 921, DMS1, and the combiner/splitter 964) to the coverage antenna 268 for radiation into coverage area 121. UE uplink radio frequency signals received from UE 122 by the coverage antenna 268 in the uplink band are passed via the FDD UL band filter 951 to the bidirectional RX path 240 but filtered out and not passed by the FDD DL band filter 921 to the bidirectional RX path 220. The repeater controller 205 outputs the repeated digital uplink signal to the bidirectional TX path 230, which passes the resulting analog repeated RF uplink signal (via FDD UL band filter 941 and combiner/splitter 963) to donor antenna 266 for transmission to the base station 110. It should be appreciated that in this FDD mode, the uplink and downlink communications are separated into different frequency bands and that switching synchronization between UL and DL transmission mode is not applicable.

Example Embodiments

Example 1 includes a reconfigurable radio frequency (RF) signal repeater switchable between single-input-single-output (SISO) and multiple-input-multiple-output (MIMO) operating modes, the repeater comprising: a repeater controller; a first bidirectional transmitter path coupled to the repeater controller, and switchably coupled to a first donor antenna and a first coverage antenna; a second bidirectional transmitter path coupled to the repeater controller, and switchably coupled to a second donor antenna and a second coverage antenna; a first bidirectional receiver path coupled to the repeater controller, and switchably coupled to the first donor antenna and the first coverage antenna; a second bidirectional receiver path coupled to the repeater controller, and switchably coupled to the second donor antenna and the second coverage antenna; wherein the repeater controller is adapted to configure the repeater for a MIMO time-division-duplex (TDD) operating mode by: configuring the first bidirectional transmitter path and the second bidirectional receiver path to repeat at least a first MIMO channel of user equipment (UE) uplink RF signals and at least a first MIMO channel of base station downlink RF signals; and configuring the second bidirectional transmitter path and the first bidirectional receiver path to repeat at least a second MIMO channel of user equipment (UE) uplink RF signals and at least a second MIMO channel of base station downlink RF signals.

Example 2 includes the repeater of Example 1, wherein the repeater controller is adapted to configure the first bidirectional transmitter path, the second bidirectional transmitter path, the first bidirectional receiver path and the second bidirectional receiver path for an extended bandwidth SISO time-division-duplex (TDD) operating mode for a SISO channel having a bandwidth of up to twice the bandwidth of a bidirectional MIMO signal path that carries either of the first or second MIMO channels.

Example 3 includes the repeater of Example 2, wherein the repeater controller is adapted to configure the repeater for the extended bandwidth SISO time-division-duplex (TDD) operating mode by utilizing both an analog-to-digital converter of the first bidirectional receiver path and an analog-to-digital converter of the second bidirectional receiver path to convert a received RF signal for input to the repeater controller, and by utilizing both a digital-to-analog converter of the first bidirectional transmitter path and a digital-to-analog converter of the second bidirectional transmitter path to convert a repeated signal output from the repeater controller to an analog RF signal for transmission.

Example 4 includes the repeater of any of Examples 1-3, wherein to increase bandwidth in SISO operation, the repeater controller is adapted to configure the first bidirectional transmitter path, the second bidirectional transmitter path, the first bidirectional receiver path and the second bidirectional receiver path for a two-channel SISO time-division-duplex (TDD) operating mode for a first SISO channel having a bandwidth of up to the bandwidth of a bidirectional MIMO signal path that carries either of the first or second MIMO channels, and a second SISO channel having a bandwidth of up to the bandwidth of the bidirectional MIMO signal path that carries either of the first or second MIMO channels.

Example 5 includes the repeater of Example 4, wherein the repeater controller is adapted to configure the repeater for the two-channel SISO time-division-duplex (TDD) operating mode by configuring the first bidirectional transmitter path and the second bidirectional receiver path to repeat a first SISO channel of user equipment (UE) uplink RF signals and a first SISO channel of base station downlink RF signals; and configuring the second bidirectional transmitter path and the first bidirectional receiver path to repeat a second SISO channel of user equipment (UE) uplink RF signals and a second SISO channel of base station downlink RF signals.

Example 6 includes the repeater of any of Examples 1-5, where the repeater controller is configured to dynamically adjust system gains and system power of the first bidirectional transmitter path and the second bidirectional transmitter path and dynamically adjust system gains and system power of the first bidirectional receiver path and the second bidirectional receiver path such that repeated uplink RF signals and repeated downlink RF signals are each transmitted by the repeater at respective pre-determined power levels.

Example 7 includes the repeater of any of Examples 1-6, where the repeater controller comprises: a controller coupled to a memory, wherein the controller executes at least one of: a mode configuration manager executed by the controller that manages reconfiguration of the first bidirectional transmitter path, the second bidirectional transmitter path, the first bidirectional receiver path, and the second bidirectional receiver path, for switching between 2×2 MIMO, extended bandwidth SISO, and two-channel SISO operating modes; a TDD synchronizer comprising one or more algorithms for synchronizing the switching of the repeater between uplink and downlink operating with a TDD schedule of a base station; and a signal processing function which performs at least one of: system gain control, system power control, filter configurations, crest factor reduction, and digital pre-distortion adjustments.

Example 8 includes the repeater of any of Examples 1-7, wherein the first bidirectional transmitter path comprises: a first digital-to-analog converter coupled to the repeater controller; a first power amplifier; a path configuration switch coupled between the digital-to-analog converter and the first power amplifier, wherein the path configuration switch is controlled by the repeater controller and configured to switch the output from the digital-to-analog converter to either the first power amplifier or to a signal combiner of the second bidirectional transmitter path; and a first antenna select switch operated by the repeater controller, wherein the first antenna select switch couples an output from the first power amplifier to the first donor antenna when the repeater is repeating UE uplink RF signals, and to the first coverage antenna when the repeater is repeating base station downlink RF signals.

Example 9 includes the repeater of Example 8, wherein the second bidirectional transmitter path comprises: a second digital-to-analog converter; a second power amplifier; wherein the signal combiner is coupled between the digital-to-analog converter and the second power amplifier, wherein the signal combiner is coupled to an output of the path configuration switch of the first bidirectional transmitter path and coupled to an output of the second digital-to-analog converter, and provide an analog input to the second power amplifier; and a second antenna select switch operated by the repeater controller, wherein the second antenna select switch couples an output from the second power amplifier to the second donor antenna when the repeater is repeating UE uplink RF signals, and to the second coverage antenna when the repeater is repeating base station downlink RF signals.

Example 10 includes the repeater of any of Examples 1-9, wherein the first bidirectional receiver path comprises: a first analog-to-digital converter coupled to the repeater controller; a first low-noise amplifier; a path configuration switch coupled between the first analog-to-digital converter and the first low-noise amplifier, wherein the path configuration switch is controlled by the repeater controller and configured to switch the input to the first analog-to-digital converter to either an input from the first low-noise amplifier or to an input from a signal splitter of the second bidirectional receiver path; and a first antenna select switch operated by the repeater controller, wherein the first antenna select switch couples the first low-noise amplifier to the first donor antenna when the repeater is repeating base station downlink RF signals, and to the first coverage antenna when the repeater is repeating UE uplink RF signals.

Example 11 includes the repeater of Example 10, wherein the second bidirectional receiver path comprises: a second analog-to-digital converter coupled to the repeater controller; a second low-noise amplifier; wherein the signal splitter is coupled between the second analog-to-digital converter and the second low-noise amplifier, wherein the signal splitter splits a first portion of an output from the low-noise amplifier to the path configuration switch of the first bidirectional receiver path and a second portion of the output from the low-noise amplifier to the second analog-to-digital converter; and a second antenna select switch operated by the repeater controller, wherein the second antenna select switch couples the second low-noise amplifier to the second donor antenna when the repeater is repeating base station downlink RF signals, and to the second coverage antenna when the repeater is repeating UE uplink RF signals.

Example 12 includes the repeater of any of Examples 1-11, wherein the first donor antenna is coupled to both the first bidirectional transmitter path and the first bidirectional receiver path via a first antenna isolation circuit; wherein the first coverage antenna is coupled to both the first bidirectional transmitter path and the first bidirectional receiver path via a second antenna isolation circuit; wherein the second donor antenna is coupled to both the second bidirectional transmitter path and the second bidirectional receiver path via a third antenna isolation circuit; and wherein the second coverage antenna is coupled to both the second bidirectional transmitter path and the second bidirectional receiver path via a fourth antenna isolation circuit.

Example 13 includes the repeater of Example 12, further comprising: a time-division-duplex (TDD)/frequency-division-duplex (FDD) switching circuit configured to adjust the repeater to either TDD or FDD operation.

Example 14 includes the repeater of Example 13, wherein the TDD/FDD switching circuit comprises: a first switchable filter set comprising an FDD downlink band filter and a TDD band filter, the first filter set coupled to the first antenna isolation circuit; a second switchable filter set comprising an FDD downlink band filter and a TDD band filter, the second filter set coupled to the second antenna isolation circuit; a third switchable filter set comprising an FDD uplink band filter and a TDD band filter, the third filter set coupled to the third antenna isolation circuit; and a fourth switchable filter set comprising an FDD uplink band filter and a TDD band filter, the fourth filter set coupled to the fourth antenna isolation circuit.

Example 15 includes a wireless radio frequency (RF) communication system, the system comprising: one or more wireless communications network base stations; and an RF signal repeater switchable between single-input-single-output (SISO) and multiple-input-multiple-output (MIMO)

operating modes, wherein the RF signal repeater comprises a first donor antenna and a second donor antenna for communicating with the one or more wireless communications network base stations, and a first coverage antenna and a second coverage antenna for communicating with one or more user equipment (UE) within a coverage area; wherein the RF signal repeater further comprises: a repeater controller; a first bidirectional transmitter path coupled to the repeater controller, and switchably coupled to a first donor antenna and a first coverage antenna; a second bidirectional transmitter path coupled to the repeater controller, and switchably coupled to a second donor antenna and a second coverage antenna; a first bidirectional receiver path coupled to the repeater controller, and switchably coupled to the first donor antenna and the first coverage antenna; and a second bidirectional receiver path coupled to the repeater controller, and switchably coupled to the second donor antenna and the second coverage antenna; wherein the repeater controller is adapted to configure the repeater for a MIMO time-division-duplex (TDD) operating mode by: configuring the first bidirectional transmitter path and the second bidirectional receiver path to repeat at least a first MIMO channel of user equipment (UE) uplink RF signals and at least a first MIMO channel of base station downlink RF signals; and configuring the second bidirectional transmitter path and the first bidirectional receiver path to repeat at least a second MIMO channel of user equipment (UE) uplink RF signals and at least a second MIMO channel of base station downlink RF signals.

Example 16 includes the system of Example 15, wherein the repeater controller is adapted to configure the first bidirectional transmitter path, the second bidirectional transmitter path, the first bidirectional receiver path and the second bidirectional receiver path for an extended bandwidth SISO time-division-duplex (TDD) operating mode for a SISO channel having a bandwidth of up to twice the bandwidth of a bidirectional MIMO signal path that carries either of the first or second MIMO channels.

Example 17 includes the system of Example 16, wherein the repeater controller is adapted to configure the repeater for the extended bandwidth SISO time-division-duplex (TDD) operating mode by utilizing both an analog-to-digital converter of the first bidirectional receiver path and an analog-to-digital converter of the second bidirectional receiver path to convert a received RF signal for input to the repeater controller, and by utilizing both a digital-to-analog converter of the first bidirectional transmitter path and a digital-to-analog converter of the second bidirectional transmitter path to convert a repeated signal output from the repeater controller to an analog RF signal for transmission.

Example 18 includes the system of any of Examples 15-17, wherein to increase bandwidth in SISO operation, the repeater controller is adapted to configure the first bidirectional transmitter path, the second bidirectional transmitter path, the first bidirectional receiver path and the second bidirectional receiver path for a two-channel SISO time-division-duplex (TDD) operating mode for a first SISO channel having a bandwidth of up to the bandwidth of a bidirectional MIMO signal path that carries either of the first or second MIMO channels, and a second SISO channel having a bandwidth of up to the bandwidth of the bidirectional MIMO signal path that carries either of the first or second MIMO channels.

Example 19 includes the system of Example 18, wherein the repeater controller is adapted to configure the repeater for the two-channel SISO time-division-duplex (TDD) operating mode by configuring the first bidirectional transmitter path and the second bidirectional receiver path to repeat a first SISO channel of user equipment (UE) uplink RF signals and a first SISO channel of base station downlink RF signals; and configuring the second bidirectional transmitter path and the first bidirectional receiver path to repeat a second SISO channel of user equipment (UE) uplink RF signals and a second SISO channel of base station downlink RF signals.

Example 20 includes the system of any of Examples 15-19, where the repeater controller is configured to dynamically adjust system gains and system power of the first bidirectional transmitter path and the second bidirectional transmitter path, and the first bidirectional receiver path and the second bidirectional receiver path, such that repeated uplink RF signals and repeated downlink RF signals are each transmitted by the repeater at respective pre-determined power levels.

Example 21 includes the system of any of Examples 15-20, where the repeater controller comprises: a controller coupled to a memory, wherein the controller executes at least one of: a mode configuration manager executed by the controller that manages reconfiguration of the first bidirectional transmitter path, the second bidirectional transmitter path, the first bidirectional receiver path, and the second bidirectional receiver path, for switching between 2×2 MIMO, extended bandwidth SISO, and two-channel SISO operating modes; a TDD synchronizer comprising one or more algorithms for synchronizing the switching of the repeater between uplink and downlink operating with a TDD schedule of the one or more wireless communications network base stations; and a signal processing function which performs at least one of: system gain control, system power control, filter configurations, crest factor reduction, and digital pre-distortion adjustments.

Example 22 includes the system of any of Examples 15-21, wherein the first bidirectional transmitter path comprises: a first digital-to-analog converter coupled to the repeater controller; a first power amplifier; a path configuration switch coupled between the digital-to-analog converter and the first power amplifier, wherein the path configuration switch is controlled by the repeater controller and configured to switch the output from the digital-to-analog converter to either the first power amplifier or to a signal combiner of the second bidirectional transmitter path; and a first antenna select switch operated by the repeater controller, wherein the first antenna select switch couples an output from the first power amplifier to the first donor antenna when the repeater is repeating UE uplink RF signals, and to the first coverage antenna when the repeater is repeating base station downlink RF signals.

Example 23 includes the system of Example 22, wherein the second bidirectional transmitter path comprises: a second digital-to-analog converter; a second power amplifier; wherein the signal combiner is coupled between the digital-to-analog converter and the second power amplifier, wherein the signal combiner is coupled to an output of the path configuration switch of the first bidirectional transmitter path and coupled to an output of the second digital-to-analog converter, and provide an analog input to the second power amplifier; and a second antenna select switch operated by the repeater controller, wherein the second antenna select switch couples an output from the second power amplifier to the second donor antenna when the repeater is repeating UE uplink RF signals, and to the second coverage antenna when the repeater is repeating base station downlink RF signals.

Example 24 includes the system of any of Examples 15-23, wherein the first bidirectional receiver path comprises: a first analog-to-digital converter coupled to the repeater controller; a first low-noise amplifier; a path configuration switch coupled between the first analog-to-digital converter and the first low-noise amplifier, wherein the path configuration switch is controlled by the repeater controller and configured to switch the input to the first analog-to-digital converter to either an input from the first low-noise amplifier or to an input from a signal splitter of the second bidirectional receiver path; and a first antenna select switch operated by the repeater controller, wherein the first antenna select switch couples the first low-noise amplifier to the first donor antenna when the repeater is repeating base station downlink RF signals, and to the first coverage antenna when the repeater is repeating UE uplink RF signals.

Example 25 includes the system of Example 24, wherein the second bidirectional receiver path comprises: a second analog-to-digital converter coupled to the repeater controller; a second low-noise amplifier; wherein the signal splitter is coupled between the second analog-to-digital converter and the second low-noise amplifier, wherein the signal splitter splits a first portion of an output from the low-noise amplifier to the path configuration switch of the first bidirectional receiver path and a second portion of the output from the low-noise amplifier to the second analog-to-digital converter; and a second antenna select switch operated by the repeater controller, wherein the second antenna select switch couples the second low-noise amplifier to the second donor antenna when the repeater is repeating base station downlink RF signals, and to the second coverage antenna when the repeater is repeating UE uplink RF signals.

Example 26 includes the system of any of Examples 15-25, wherein the first donor antenna is couple to both the first bidirectional transmitter path and the first bidirectional receiver path via a first antenna isolation circuit; wherein the first coverage antenna is coupled to both the first bidirectional transmitter path and the first bidirectional receiver path via a second antenna isolation circuit; wherein the second donor antenna is coupled to both the second bidirectional transmitter path and the second bidirectional receiver path via a third antenna isolation circuit; and wherein the second coverage antenna is coupled to both the second bidirectional transmitter path and the second bidirectional receiver path via a fourth antenna isolation circuit.

Example 27 includes the system of Example 26, further comprising: a time-division-duplex (TDD)/frequency-division-duplex (FDD) switching circuit configured to adjust the repeater to either TDD or FDD operation.

Example 28 includes the system of Example 27, wherein the TDD/FDD switching circuit comprises: a first switchable filter set comprising an FDD downlink band filter and a TDD band filter, the first filter set coupled to the first antenna isolation circuit; a second switchable filter set comprising an FDD downlink band filter and a TDD band filter, the second filter set coupled to the second antenna isolation circuit; a third switchable filter set comprising an FDD uplink band filter and a TDD band filter, the third filter set coupled to the third antenna isolation circuit; and a fourth switchable filter set comprising an FDD uplink band filter and a TDD band filter, the fourth filter set coupled to the fourth antenna isolation circuit.

In various alternative embodiments, system and/or device elements, method steps, or example implementations described throughout this disclosure (such as any of the bidirectional transmitter or receiver paths, the repeater controller, the antenna isolation circuits, FDD/TDD switching circuit, or any controllers, filters, circuits, or sub-parts thereof, for example) may be implemented at least in part using one or more computer systems, field-programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer-readable media which, when implemented by such computer systems, enable them to implement the embodiments described herein. As used herein, the term "computer-readable media" refers to tangible memory storage devices having non-transient physical forms. Such non-transient physical forms may include computer memory devices, such as but not limited to punch cards, magnetic disk or tape, any optical data storage system, flash read-only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High Speed Integrated Circuit (VHSIC) Hardware Description Language (VHDL).

As used herein, wireless repeater and network-related terms such as "base station, core network, repeater, user equipment, bidirectional transmitter or receiver paths, the repeater controller, the antenna isolation circuits, FDD/TDD switching circuit, or any controllers, memory, user interface, mode configuration manager or RF signal processing function," refer to non-generic elements as would be recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A reconfigurable radio frequency (RF) signal repeater switchable between single-input-single-output (SISO) and multiple-input-multiple-output (MIMO) operating modes, the repeater comprising:
  a repeater controller;
  a first bidirectional transmitter path coupled to the repeater controller, and switchably coupled to a first donor antenna and a first coverage antenna;
  a second bidirectional transmitter path coupled to the repeater controller, and switchably coupled to a second donor antenna and a second coverage antenna;
  a first bidirectional receiver path coupled to the repeater controller, and switchably coupled to the first donor antenna and the first coverage antenna; and
  a second bidirectional receiver path coupled to the repeater controller, and switchably coupled to the second donor antenna and the second coverage antenna;
  wherein the repeater controller is adapted to configure the repeater for a MIMO time-division-duplex (TDD) operating mode by:
    configuring the first bidirectional transmitter path and the second bidirectional receiver path to repeat at least a first MIMO channel of user equipment (UE)

uplink RF signals and at least a first MIMO channel of base station downlink RF signals; and configuring the second bidirectional transmitter path and the first bidirectional receiver path to repeat at least a second MIMO channel of user equipment (UE) uplink RF signals and at least a second MIMO channel of base station downlink RF signals.

2. The repeater of claim 1, wherein the repeater controller is adapted to configure the first bidirectional transmitter path, the second bidirectional transmitter path, the first bidirectional receiver path and the second bidirectional receiver path for an extended bandwidth SISO time-division-duplex (TDD) operating mode for a SISO channel having a bandwidth of up to twice the bandwidth of a bidirectional MIMO signal path that carries either of the first or second MIMO channels.

3. The repeater of claim 2, wherein the repeater controller is adapted to configure the repeater for the extended bandwidth SISO time-division-duplex (TDD) operating mode by utilizing both an analog-to-digital converter of the first bidirectional receiver path and an analog-to-digital converter of the second bidirectional receiver path to convert a received RF signal for input to the repeater controller, and by utilizing both a digital-to-analog converter of the first bidirectional transmitter path and a digital-to-analog converter of the second bidirectional transmitter path to convert a repeated signal output from the repeater controller to an analog RF signal for transmission.

4. The repeater of claim 1, wherein to increase bandwidth in SISO operation, the repeater controller is adapted to configure the first bidirectional transmitter path, the second bidirectional transmitter path, the first bidirectional receiver path and the second bidirectional receiver path for a two-channel SISO time-division-duplex (TDD) operating mode for a first SISO channel having a bandwidth of up to the bandwidth of a bidirectional MIMO signal path that carries either of the first or second MIMO channels, and a second SISO channel having a bandwidth of up to the bandwidth of the bidirectional MIMO signal path that carries either of the first or second MIMO channels.

5. The repeater of claim 4, wherein the repeater controller is adapted to configure the repeater for the two-channel SISO time-division-duplex (TDD) operating mode by configuring the first bidirectional transmitter path and the second bidirectional receiver path to repeat a first SISO channel of user equipment (UE) uplink RF signals and a first SISO channel of base station downlink RF signals; and configuring the second bidirectional transmitter path and the first bidirectional receiver path to repeat a second SISO channel of user equipment (UE) uplink RF signals and a second SISO channel of base station downlink RF signals.

6. The repeater of claim 1, where the repeater controller is configured to dynamically adjust system gains and system power of the first bidirectional transmitter path and the second bidirectional transmitter path and dynamically adjust system gains and system power of the first bidirectional receiver path and the second bidirectional receiver path such that repeated uplink RF signals and repeated downlink RF signals are each transmitted by the repeater at respective pre-determined power levels.

7. The repeater of claim 1, where the repeater controller comprises:

a controller coupled to a memory, wherein the controller executes at least one of:

a mode configuration manager executed by the controller that manages reconfiguration of the first bidirectional transmitter path, the second bidirectional transmitter path, the first bidirectional receiver path, and the second bidirectional receiver path, for switching between 2×2 MIMO, extended bandwidth SISO, and two-channel SISO operating modes;

a TDD synchronizer comprising one or more algorithms for synchronizing the switching of the repeater between uplink and downlink operating with a TDD schedule of a base station; and a signal processing function which performs at least one of: system gain control, system power control, filter configurations, crest factor reduction, and digital pre-distortion adjustments.

8. The repeater of claim 1, wherein the first bidirectional transmitter path comprises:

a first digital-to-analog converter coupled to the repeater controller;

a first power amplifier;

a path configuration switch coupled between the digital-to-analog converter and the first power amplifier, wherein the path configuration switch is controlled by the repeater controller and configured to switch the output from the digital-to-analog converter to either the first power amplifier or to a signal combiner of the second bidirectional transmitter path; and a first antenna select switch operated by the repeater controller, wherein the first antenna select switch couples an output from the first power amplifier to the first donor antenna when the repeater is repeating UE uplink RF signals, and to the first coverage antenna when the repeater is repeating base station downlink RF signals.

9. The repeater of claim 8, wherein the second bidirectional transmitter path comprises:

a second digital-to-analog converter;

a second power amplifier;

wherein the signal combiner is coupled between the digital-to-analog converter and the second power amplifier, wherein the signal combiner is coupled to an output of the path configuration switch of the first bidirectional transmitter path and coupled to an output of the second digital-to-analog converter, and provide an analog input to the second power amplifier; and a second antenna select switch operated by the repeater controller, wherein the second antenna select switch couples an output from the second power amplifier to the second donor antenna when the repeater is repeating the UE uplink RF signals, and to the second coverage antenna when the repeater is repeating the base station downlink RF signals.

10. The repeater of claim 1, wherein the first bidirectional receiver path comprises:

a first analog-to-digital converter coupled to the repeater controller;

a first low-noise amplifier;

a path configuration switch coupled between the first analog-to-digital converter and the first low-noise amplifier, wherein the path configuration switch is controlled by the repeater controller and configured to switch the input to the first analog-to-digital converter to either an input from the first low-noise amplifier or to an input from a signal splitter of the second bidirectional receiver path; and a first antenna select switch operated by the repeater controller, wherein the first antenna select switch couples the first low-noise amplifier to the first donor antenna when the repeater is repeating base station downlink RF signals, and to the first coverage antenna when the repeater is repeating UE uplink RF signals.

11. The repeater of claim 10, wherein the second bidirectional receiver path comprises:
a second analog-to-digital converter coupled to the repeater controller;
a second low-noise amplifier;
wherein the signal splitter is coupled between the second analog-to-digital converter and the second low-noise amplifier, wherein the signal splitter splits a first portion of an output from the low-noise amplifier to the path configuration switch of the first bidirectional receiver path and a second portion of the output from the low-noise amplifier to the second analog-to-digital converter; and
a second antenna select switch operated by the repeater controller, wherein the second antenna select switch couples the second low-noise amplifier to the second donor antenna when the repeater is repeating the base station downlink RF signals, and to the second coverage antenna when the repeater is repeating the UE uplink RF signals.

12. The repeater of claim 1, wherein the first donor antenna is coupled to both the first bidirectional transmitter path and the first bidirectional receiver path via a first antenna isolation circuit;
wherein the first coverage antenna is coupled to both the first bidirectional transmitter path and the first bidirectional receiver path via a second antenna isolation circuit;
wherein the second donor antenna is coupled to both the second bidirectional transmitter path and the second bidirectional receiver path via a third antenna isolation circuit; and
wherein the second coverage antenna is coupled to both the second bidirectional transmitter path and the second bidirectional receiver path via a fourth antenna isolation circuit.

13. The repeater of claim 12, further comprising:
a time-division-duplex (TDD)/frequency-division-duplex (FDD) switching circuit configured to adjust the repeater to either TDD or FDD operation.

14. The repeater of claim 13, wherein the TDD/FDD switching circuit comprises:
a first switchable filter set comprising an FDD downlink band filter and a TDD band filter, the first filter set coupled to the first antenna isolation circuit;
a second switchable filter set comprising an FDD downlink band filter and a TDD band filter, the second filter set coupled to the second antenna isolation circuit;
a third switchable filter set comprising an FDD uplink band filter and a TDD band filter, the third filter set coupled to the third antenna isolation circuit; and
a fourth switchable filter set comprising an FDD uplink band filter and a TDD band filter, the fourth filter set coupled to the fourth antenna isolation circuit.

15. A wireless radio frequency (RF) communication system, the system comprising:
one or more wireless communications network base station; and
an RF signal repeater switchable between single-input-single-output (SISO) and multiple-input-multiple-output (MIMO) operating modes, wherein the RF signal repeater comprises a first donor antenna and a second donor antenna for communicating with the one or more wireless communications network base station, and a first coverage antenna and a second coverage antenna for communicating with one or more user equipment (UE) within a coverage area;
wherein the RF signal repeater further comprises:
a repeater controller;
a first bidirectional transmitter path coupled to the repeater controller, and switchably coupled to a first donor antenna and a first coverage antenna;
a second bidirectional transmitter path coupled to the repeater controller, and switchably coupled to a second donor antenna and a second coverage antenna;
a first bidirectional receiver path coupled to the repeater controller, and switchably coupled to the first donor antenna and the first coverage antenna; and
a second bidirectional receiver path coupled to the repeater controller, and switchably coupled to the second donor antenna and the second coverage antenna;
wherein the repeater controller is adapted to configure the repeater for a MIMO time-division-duplex (TDD) operating mode by:
configuring the first bidirectional transmitter path and the second bidirectional receiver path to repeat at least a first MIMO channel of user equipment (UE) uplink RF signals and at least a first MIMO channel of base station downlink RF signals; and
configuring the second bidirectional transmitter path and the first bidirectional receiver path to repeat at least a second MIMO channel of user equipment (UE) uplink RF signals and at least a second MIMO channel of base station downlink RF signals.

16. The system of claim 15, wherein the repeater controller is adapted to configure the first bidirectional transmitter path, the second bidirectional transmitter path, the first bidirectional receiver path and the second bidirectional receiver path for an extended bandwidth SISO time-division-duplex (TDD) operating mode for a SISO channel having a bandwidth of up to twice the bandwidth of a bidirectional MIMO signal path that carries either of the first or second MIMO channels.

17. The system of claim 16, wherein the repeater controller is adapted to configure the repeater for the extended bandwidth SISO time-division-duplex (TDD) operating mode by utilizing both an analog-to-digital converter of the first bidirectional receiver path and an analog-to-digital converter of the second bidirectional receiver path to convert a received RF signal for input to the repeater controller, and by utilizing both a digital-to-analog converter of the first bidirectional transmitter path and a digital-to-analog converter of the second bidirectional transmitter path to convert a repeated signal output from the repeater controller to an analog RF signal for transmission.

18. The system of claim 15, wherein to increase bandwidth in SISO operation, the repeater controller is adapted to configure the first bidirectional transmitter path, the second bidirectional transmitter path, the first bidirectional receiver path and the second bidirectional receiver path for a two-channel SISO time-division-duplex (TDD) operating mode for a first SISO channel having a bandwidth of up to the bandwidth of a bidirectional MIMO signal path that carries either of the first or second MIMO channels, and a second SISO channel having a bandwidth of up to the bandwidth of the bidirectional MIMO signal path that carries either of the first or second MIMO channels.

19. The system of claim 18, wherein the repeater controller is adapted to configure the repeater for the two-channel SISO time-division-duplex (TDD) operating mode by configuring the first bidirectional transmitter path and the second bidirectional receiver path to repeat a first SISO channel of user equipment (UE) uplink RF signals and a first SISO channel of base station downlink RF signals; and configuring the second bidirectional transmitter path and the first bidirectional receiver path to repeat a second SISO channel of user equipment (UE) uplink RF signals and a second SISO channel of base station downlink RF signals.

20. The system of claim 15, where the repeater controller is configured to dynamically adjust system gains and system power of the first bidirectional transmitter path and the second bidirectional transmitter path, and the first bidirectional receiver path and the second bidirectional receiver path, such that repeated uplink RF signals and repeated downlink RF signals are each transmitted by the repeater at respective pre-determined power levels.

21. The system of claim 15, where the repeater controller comprises:
a controller coupled to a memory, wherein the controller executes at least one of:
a mode configuration manager executed by the controller that manages reconfiguration of the first bidirectional transmitter path, the second bidirectional transmitter path, the first bidirectional receiver path, and the second bidirectional receiver path, for switching between 2×2 MIMO, extended bandwidth SISO, and two-channel SISO operating modes;
a TDD synchronizer comprising one or more algorithms for synchronizing the switching of the repeater between uplink and downlink operating with a TDD schedule of the one or more wireless communications network base stations; and
a signal processing function which performs at least one of: system gain control, system power control, filter configurations, crest factor reduction, and digital pre-distortion adjustments.

22. The system of claim 15, wherein the first bidirectional transmitter path comprises:
a first digital-to-analog converter coupled to the repeater controller;
a first power amplifier;
a path configuration switch coupled between the digital-to-analog converter and the first power amplifier, wherein the path configuration switch is controlled by the repeater controller and configured to switch the output from the digital-to-analog converter to either the first power amplifier or to a signal combiner of the second bidirectional transmitter path; and
a first antenna select switch operated by the repeater controller, wherein the first antenna select switch couples an output from the first power amplifier to the first donor antenna when the repeater is repeating UE uplink RF signals, and to the first coverage antenna when the repeater is repeating base station downlink RF signals.

23. The system of claim 22, wherein the second bidirectional transmitter path comprises:
a second digital-to-analog converter;
a second power amplifier;
wherein the signal combiner is coupled between the digital-to-analog converter and the second power amplifier, wherein the signal combiner is coupled to an output of the path configuration switch of the first bidirectional transmitter path and coupled to an output of the second digital-to-analog converter, and provide an analog input to the second power amplifier; and
a second antenna select switch operated by the repeater controller, wherein the second antenna select switch couples an output from the second power amplifier to the second donor antenna when the repeater is repeating the UE uplink RF signals, and to the second coverage antenna when the repeater is repeating the base station downlink RF signals.

24. The system of claim 15, wherein the first bidirectional receiver path comprises:
a first analog-to-digital converter coupled to the repeater controller;
a first low-noise amplifier;
a path configuration switch coupled between the first analog-to-digital converter and the first low-noise amplifier, wherein the path configuration switch is controlled by the repeater controller and configured to switch the input to the first analog-to-digital converter to either an input from the first low-noise amplifier or to an input from a signal splitter of the second bidirectional receiver path; and
a first antenna select switch operated by the repeater controller, wherein the first antenna select switch couples the first low-noise amplifier to the first donor antenna when the repeater is repeating base station downlink RF signals, and to the first coverage antenna when the repeater is repeating UE uplink RF signals.

25. The system of claim 24, wherein the second bidirectional receiver path comprises:
a second analog-to-digital converter coupled to the repeater controller;
a second low-noise amplifier;
wherein the signal splitter is coupled between the second analog-to-digital converter and the second low-noise amplifier, wherein the signal splitter splits a first portion of an output from the low-noise amplifier to the path configuration switch of the first bidirectional receiver path and a second portion of the output from the low-noise amplifier to the second analog-to-digital converter; and
a second antenna select switch operated by the repeater controller, wherein the second antenna select switch couples the second low-noise amplifier to the second donor antenna when the repeater is repeating the base station downlink RF signals, and to the second coverage antenna when the repeater is repeating the UE uplink RF signals.

26. The system of claim 15, wherein the first donor antenna is couple to both the first bidirectional transmitter path and the first bidirectional receiver path via a first antenna isolation circuit;
wherein the first coverage antenna is coupled to both the first bidirectional transmitter path and the first bidirectional receiver path via a second antenna isolation circuit;
wherein the second donor antenna is coupled to both the second bidirectional transmitter path and the second bidirectional receiver path via a third antenna isolation circuit; and
wherein the second coverage antenna is coupled to both the second bidirectional transmitter path and the second bidirectional receiver path via a fourth antenna isolation circuit.

27. The system of claim 26, further comprising:
a time-division-duplex (TDD)/frequency-division-duplex (FDD) switching circuit configured to adjust the repeater to either TDD or FDD operation.

28. The system of claim 27, wherein the TDD/FDD switching circuit comprises:
a first switchable filter set comprising an FDD downlink band filter and a TDD band filter, the first filter set coupled to the first antenna isolation circuit;
a second switchable filter set comprising an FDD downlink band filter and a TDD band filter, the second filter set coupled to the second antenna isolation circuit;
a third switchable filter set comprising an FDD uplink band filter and a TDD band filter, the third filter set coupled to the third antenna isolation circuit; and
a fourth switchable filter set comprising an FDD uplink band filter and a TDD band filter, the fourth filter set coupled to the fourth antenna isolation circuit.

* * * * *